United States Patent
Wang et al.

(10) Patent No.: US 9,674,846 B2
(45) Date of Patent: Jun. 6, 2017

(54) DISTRIBUTED MULTI-CELL MULTI-USER BEAMFORMING METHOD, TRANSMITTER AND RELEVANT SYSTEM

(71) Applicant: Huawei Technologies Co., Ltd., Shenzhen (CN)

(72) Inventors: Xiaodong Wang, New York, NY (US); Hui Shen, Shenzhen (CN); Bin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 172 days.

(21) Appl. No.: 14/634,081

(22) Filed: Feb. 27, 2015

(65) Prior Publication Data
US 2015/0173090 A1    Jun. 18, 2015

Related U.S. Application Data

(63) Continuation of application No. PCT/CN2013/072822, filed on Mar. 18, 2013.

(30) Foreign Application Priority Data

Aug. 27, 2012    (CN) .......................... 2012 1 0307858

(51) Int. Cl.
*H04W 72/04* (2009.01)
*H04W 72/08* (2009.01)
(Continued)

(52) U.S. Cl.
CPC .......... *H04W 72/082* (2013.01); *H04B 7/024* (2013.01); *H04B 7/0452* (2013.01);
(Continued)

(58) Field of Classification Search
CPC ............ H04B 7/0617; H04W 72/0426; H04W 72/082

See application file for complete search history.

(56) References Cited

U.S. PATENT DOCUMENTS

2004/0219899 A1* 11/2004 Ho ....................... H04B 7/0842
                                                              455/273
2005/0287978 A1* 12/2005 Maltsev ............... H04B 7/0634
                                                              455/403
(Continued)

FOREIGN PATENT DOCUMENTS

CN          1806399 A       7/2006
CN          1957546 A       5/2007
(Continued)

OTHER PUBLICATIONS

Cadambe et al., "Interference Alignment and Spatial Degrees of Freedom for the K User Interference Channel," IEEE International Conference on Communications, pp. 971-975, Institute of Electrical and Electronics Engineers, New York, New York (May 19-23, 2008).

(Continued)

*Primary Examiner* — Benjamin Lamont
(74) *Attorney, Agent, or Firm* — Leydig, Voit & Mayer, Ltd.

(57) ABSTRACT

Disclosed are a distributed multi-cell multi-user beamforming method, a transmitter and a relevant system. In the distributed beamforming method in the embodiments of the present invention, beamforming coordinated calculation is performed by a plurality of transmitters, and an interference matrix among the transmitters is used to perform an iterative operation on a beamforming vector corresponding to the data which is to be sent to each user over each sub-channel of this cell, so that the interference dimension of each user over each sub-channel of the transmitters is compressed into a subspace as small as possible.

19 Claims, 3 Drawing Sheets

(51) Int. Cl.
| | | |
|---|---|---|
| H04W 16/28 | (2009.01) | |
| H04B 7/024 | (2017.01) | |
| H04B 7/0452 | (2017.01) | |
| H04B 7/06 | (2006.01) | |
| H04L 5/00 | (2006.01) | |
| H04L 1/00 | (2006.01) | |

(52) U.S. Cl.
CPC .............. *H04B 7/0617* (2013.01); *H04L 1/00* (2013.01); *H04L 5/0032* (2013.01); *H04L 5/0073* (2013.01); *H04W 16/28* (2013.01); *H04W 72/046* (2013.01)

(56) References Cited

U.S. PATENT DOCUMENTS

| | | | | |
|---|---|---|---|---|
| 2006/0203891 | A1* | 9/2006 | Sampath | H04B 7/0417 375/132 |
| 2007/0129111 | A1 | 6/2007 | Kim et al. | |
| 2009/0296650 | A1* | 12/2009 | Venturino | H04W 16/28 370/330 |
| 2011/0177834 | A1* | 7/2011 | Shin | H04J 11/0033 455/501 |
| 2011/0182375 | A1* | 7/2011 | Kim | H04W 72/0426 375/260 |
| 2011/0223867 | A1* | 9/2011 | Chae | H04B 7/0404 455/63.1 |
| 2012/0051459 | A1* | 3/2012 | Liu | H04B 7/0413 375/296 |
| 2012/0057484 | A1* | 3/2012 | Wan | H04L 1/0026 370/252 |
| 2012/0077511 | A1* | 3/2012 | Shin | H04B 7/022 455/452.1 |
| 2012/0250780 | A1* | 10/2012 | Shen | H04B 7/0413 375/285 |
| 2013/0114468 | A1* | 5/2013 | Hui | H01Q 3/2611 370/277 |
| 2013/0279422 | A1* | 10/2013 | Kim | H04W 24/02 370/328 |
| 2013/0279428 | A1* | 10/2013 | Liu | H04B 7/0456 370/329 |
| 2014/0003274 | A1* | 1/2014 | Clerckx | H04L 25/0204 370/252 |
| 2014/0226520 | A1* | 8/2014 | Seo | H04B 7/0434 370/252 |

FOREIGN PATENT DOCUMENTS

| | | | | |
|---|---|---|---|---|
| CN | 101171817 | A | 4/2008 | |
| CN | WO 2010105417 | A1 * | 9/2010 | ........... H04L 1/0026 |
| CN | WO 2010130085 | A1 * | 11/2010 | ........... H04B 7/0413 |
| CN | 101965062 | A | 2/2011 | |
| CN | 102104453 | A | 6/2011 | |
| CN | WO 2012055276 | A1 * | 5/2012 | ........... H04B 7/0456 |
| KR | WO 2012093904 | A2 * | 7/2012 | ........... H04W 24/02 |
| WO | WO 2011112314 | A1 | 9/2011 | |

OTHER PUBLICATIONS

Sung et al., "An Iterative Precoder Optimization Method for K-user Interference Channel Systems," IEEE Global Telecommunications Conference, pp. 1-5, Institute of Electrical and Electronics Engineers, New York, New York (Nov. 30-Dec. 4, 2009).

Thukral et al., "Interference Alignment with Limited Feedback," IEEE International Symposium on Information Theory, pp. 1759-1763, Institute of Electrical and Electronics Engineers, New York, New York (Jun. 28-Jul. 3, 2009).

Tresch et al., "Cellular Interference Alignment with Imperfect Channel Knowledge," IEEE International Conference on Communications Workshops, pp. 1-5, Institute of Electrical and Electronics Engineers, New York, New York (Jun. 14-18, 2009).

Peters et al., "Interference Alignment via Alternating Minimization," IEEE International Conference on Acoustics, Speech and Signal Processing, pp. 2445-2448, Institute of Electrical and Electronics Engineers, New York, New York (Apr. 19-24, 2009).

Gou et al., "Degrees of Freedom of the K User M×N MIMO Interference Channel," IEEE Transactions on Information Theory, pp. 6040-6057, vol. 56, Issue 12, Institute of Electrical and Electronics Engineers, New York, New York (Dec. 2010).

Gomadam et al., "Approaching the Capacity of Wireless Networks through Distributed Interference Alignment," IEEE Global Telecommunications Conference, pp. 1-6, Institute of Electrical and Electronics Engineers, New York, New York (Nov. 30-Dec. 4, 2008).

Sridharan et al., "A Layered Lattice Coding Scheme for a Class of Three User Gaussian Interference Channels," 46th Annual Allerton Conference on Communication, Control, and Computing, pp. 531-538, Institute of Electrical and Electronics Engineers, New York, New York (Sep. 23, 2008).

Etkin et al., "On the Degrees-of-Freedom of the K-User Gaussian Interference Channel," IEEE International Symposium on Information Theory, pp. 1919- 1923, Institute of Electrical and Electronics Engineers, New York, New York (Jun. 28-Jul. 3, 2009).

Cadambe et al., "Interference Alignment on the Deterministic Channel and Application to Fully Connected AWGN Interference Networks," IEEE Information Theory Workshop, pp. 41-45, Institute of Electrical and Electronics Engineers, New York, New York (May 5-9, 2008).

Cadambe et al., "Interference Alignment and Degrees of Freedom of the K-User Interference Channel," IEEE Transactions on Information Theory, pp. 3425-3441, vol. 54, Issue 8, Institute of Electrical and Electronics Engineers, New York, New York (Aug. 2008).

Devroye et al., "The Multiplexing Gain of MIMO X-Channels with Partial Transmit Side-Information," IEEE International Symposium on Information Theory, pp. 1-5, Institute of Electrical and Electronics Engineers, New York, New York (Jun. 24-29, 2007).

Jafar et al., "Degrees of Freedom Region of the MIMO X Channel," IEEE Transactions on Information Theory, pp. 151-170, vol. 54, Issue 1, Institute of Electrical and Electronics Engineers, New York, New York (Jan. 4, 2008).

Jafar et al., "Degrees of Freedom for the MIMO Interference Channel," IEEE Transactions on Information Theory, pp. 2637-2642, vol. 53, Issue 7, Institute of Electrical and Electronics Engineers, New York, New York (Jul. 2007).

Shimi Shilo et al.,"Performance of Suboptimal Beamforming with Full Knowledge of Part of the Channel Matrix",2010 IEEE 26-th Convention of Electrical and Electronics Engineers in Israel,dated Dec. 31, 2010,total 5 pages.

* cited by examiner

DISTRIBUTED MULTI-CELL MULTI-USER BEAMFORMING METHOD, TRANSMITTER AND RELEVANT SYSTEM

CROSS REFERENCES OF RELATED APPLICATION

The present application is a continuation of International Patent Application No. PCT/CN2013/072822, filed on Mar. 18, 2013, which claims the priority to Chinese Patent Application No. 201210307858.3, filed on Aug. 27, 2012, both of which are incorporated herein by reference in their entirety.

TECHNICAL FIELD

The disclosure relates to the communication field, and in particular to a multi-cell multi-user distributed beamforming method, a transmitter and a relevant system.

BACKGROUND

In a wireless communication system, solving interference among signals during transmission is still a concern. A Gaussian interference channel is mainly characterized in that, signals of different users interfere with each other and the users can not share data and perform joint transmission, but each user knows complete channel information.

To avoid signal interference among users, data is transmitted in a time division multiple access (TDMA) mode in the conventional technology, that is, a transmitter transmits data to users in different time slots. For example, a transmitter tx1 and a transmitter tx2 respectively transmit data of user 1 and data of user 2 to a receiver rx1 and a receiver rx2 of the corresponding users in different time slots in the TDMA mode. Since the data is transmitted in different time slots, interference among signals of different users is avoided. The transmitter may also transmit data in a frequency division multiple access (FDMA) mode currently. Similar to TDMA, the transmitter transmits data to users in channels with a same time slot and different frequencies in the FDMA mode, and interference among signals of different users can also be avoided by using the FDMA mode.

It can be known from the above that transmitting data in the FDMA or TDMA mode can avoid interference among signals of different users, but it is required that only data of one user is transmitted in one time slot or one frequency in the system, thereby causing low overall channel capacity of the system and limiting system throughput.

SUMMARY

It is provided a distributed beamforming method, a transmitter and a relevant system according to embodiments of the disclosure, for reducing signal interference among users and improving channel capacity of the system.

Technical solutions provided according to the embodiments of the disclosure are as follows.

In a first aspect of the disclosure, a multi-cell multi-user distributed beamforming method is provided, including:

transmitting, by a transmitter, channel coefficient matrix information of a cell that the transmitter belongs to other transmitter performing coordinated beamforming with the transmitter, where the channel coefficient matrix information of the cell that the transmitter belongs to includes a channel coefficient matrix for each user in each subchannel of the cell that the transmitter belongs to;

acquiring channel coefficient matrix information of the other transmitter, where the channel coefficient matrix information of the other transmitter includes a channel coefficient matrix for each user in each subchannel of the other transmitter;

calculating a beamforming vector corresponding to data to be transmitted to each user in each subchannel of the cell that the transmitter belongs to and an interference matrix of the cell that the transmitter belongs to the other transmitter according to the channel coefficient matrix for each user in each subchannel of the cell that the transmitter belongs to and the channel coefficient matrix information of the other transmitter;

transmitting the interference matrix of the cell that the transmitter belongs to the other transmitter to the other transmitter, so that the next transmitter performing the coordinated beamforming with the transmitter updates the beamforming vector of the next transmitter and an interference matrix of the next transmitter to other cell;

acquiring an interference matrix of the other transmitter to the cell that the transmitter belongs to updated by the other transmitter;

when the transmitter is polled to perform calculation, updating, by the transmitter, the beamforming vector corresponding to the data to be transmitted to each user in each subchannel of the cell that the transmitter belongs to according to a last acquired interference matrix of the other transmitter to the cell that the transmitter belongs to; and determining whether a preset operational-stop condition is satisfied currently; in a case that the preset operational-stop condition is satisfied currently, transmitting the data of each user according to a last updated beamforming vector corresponding to the data to be transmitted to each user in each subchannel of the cell that the transmitter belongs to; and in a case that the preset operational-stop condition is not satisfied currently, calculating the interference matrix of the cell that the transmitter belongs to the other transmitter according to the updated beamforming vector corresponding to the data to be transmitted to each user in each subchannel of the cell that the transmitter belongs to, and repeatedly performing the processes of transmitting the interference matrix of the cell that the transmitter belongs to the other transmitter to the other transmitter, acquiring the interference matrix of the other transmitter to the cell that the transmitter belongs to updated by the other transmitter, updating the beamforming vector corresponding to the data to be transmitted to each user in each subchannel of the cell that the transmitter belongs to, and determining whether the preset operational-stop condition is satisfied currently.

Combining the first aspect of the disclosure, in a first implementation, calculating the beamforming vector corresponding to the data to be transmitted to each user in each subchannel of the cell that the transmitter belongs to and the interference matrix of the other transmitter to the cell that the transmitter belongs to according to the channel coefficient matrix for each user in each subchannel of the cell that the transmitter belongs to and the channel coefficient matrix information of the other transmitter includes:

calculating the beamforming vector corresponding to the data to be transmitted to each user in each subchannel of the cell that the transmitter belongs to according to a first formula and a second formula, where the first formula is $w_{m,k}^{(n)} = \vec{T}_{m,k}^{(n)} h_{m,k}^{(n)} / \sqrt{(1+I_{m,k}^{(n)})\phi_{m,k}^{(n)} r_{m,k}^{(n)}}$, and the second formula is $$I_{m,k}^{(n)} = \sum_{k' \in B_m^{(n)} \backslash k} \left|\vec{h}_{m,k}^{(n)} w_{m,k'}^{(n)}\right|^2 + \sum_{j \in M \backslash n} \sum_{u \in B_j^{(n)}} \left|\vec{h}_{j,k}^{(n)} w_{j,u}^{(n)}\right|^2,$$

where in the first formula, $$\phi_{m,k}^{(n)} = \left[\left[U_{m,k}^{(n)} \left(\frac{1+I_{m,k}^{(n)}}{\vec{h}_{m,k}^{(n)} \vec{T}_{m,k}^{(n)} h_{m,k}^{(n)}}\right)\right]'\right]^{-1},$$

$$r_{m,k}^{(n)} = \frac{1}{\left(\vec{h}_{m,k}^{(n)} \vec{T}_{m,k}^{(n)} h_{m,k}^{(n)}\right)^2}, \text{ and}$$

$$\vec{T}_{m,k}^{(n)} = L_{m,k}^{(n)} + \lambda_m E_{m,k}^{(n)},$$

where $L_{m,k}^{(n)} = \sum_{k' \in B_m^{(n)} \backslash k} \pi_{m,k'}^{(n)} h_{m,k'}^{(n)} \vec{h}_{m,k'}^{(n)} + \sum_{j \in M \backslash n} \sum_{u \in B_j^{(n)}} \pi_{j,u}^{(n)} h_{m,u}^{(n)} \vec{h}_{m,u}^{(n)},$ $$\pi_{m,k}^{(n)} = (U_{m,k}^{(n)})' \frac{\left|\vec{h}_{m,k}^{(n)} w_{m,k}^{(n)}\right|^2}{(1+I_{m,k}^{(n)})^2}, \text{ and}$$

$$T_{m,k}^{(n)} w_{m,k}^{(n)} = \left[U_{m,k}^{(n)} \left(\frac{\left|\vec{h}_{m,k}^{(n)} w_{m,k}^{(n)}\right|^2}{1+I_{m,k}^{(n)}}\right)\right]' \frac{h_{m,k}^{(n)} \vec{h}_{m,k}^{(n)} w_{m,k}^{(n)}}{1+I_{m,k}^{(n)}};$$

and calculating the interference matrix of the cell that the transmitter belongs to the other transmitter according to a third formula, where the third formula is $$I_{m,u}^{(n)out,j} = \sum_{k \in B_m^{(n)}} \left|\vec{h}_{m,u}^{(n)} w_{m,k}^{(n)}\right|^2,$$

where $u \in B_j^{(n)}$;

in the formulas, m represents the transmitter, M represents a set of transmitters performing coordinated beamforming, M\m represents a set of transmitters except the transmitter, $B_m^{(n)}$ represents a set of users scheduled by the transmitter in a subchannel n, $B_m^{(n)} \backslash k$ represents a set of users $B_m^{(n)}$ except a user k, $w_{m,k}^{(n)}$ represents a beamforming vector corresponding to data to be transmitted to the user k by the transmitter in the subchannel n, $\vec{w}_{m,k}^{(n)}$ represents a conjugate of $w_{m,k}^{(n)}$, $h_{m,k}^{(n)}$ represents a channel coefficient matrix between the transmitter and the user k in the subchannel n, $\vec{h}_{m,k}^{(n)}$ represents a conjugate of $h_{m,k}^{(n)}$, $\lambda_m$ represents a Lagrange duality variable of the transmitter, $U_{m,k}^{(n)}$ represents a utility function corresponding to data transmitted to the user k by the transmitter in the subchannel n; and updating the beamforming vector corresponding to the data to be transmitted to each user in each subchannel of the cell that the transmitter belongs to according to the last acquired interference matrix of the other transmitter to the cell that the transmitter belongs to includes:

updating the beamforming vector corresponding to the data to be transmitted to each user in each subchannel of the cell that the transmitter belongs to according to the last acquired interference matrix of the other transmitter to the cell that the transmitter belongs to by using the first formula and the second formula.

Combining the first implementation of the first aspect of the disclosure, in a second implementation, $U_{m,k}^{(n)}$ is in any one of following three forms:

$$U_{m,k}^n O_{m,k}^{(n)} = w_{m,k}^{(n)} \log(O_{m,k}^{(n)}),$$

$$U_{m,k}^{(n)}(O_{m,k}^{(n)}) = \log(1 + O_{m,k}^{(n)}), \text{ and}$$

$$U_{m,k}^{(n)}(O_{m,k}^{(n)}) = \begin{cases} \log(O_{m,k}^{(n)}) & a = 1 \\ (1-a)^{-1}(O_{m,k}^{(n)})^{1-a} & a \neq 1 \end{cases},$$

where in the three formulas, $$O_{m,k}^{(n)} = \frac{\left|\vec{h}_{m,k}^{(n)} w_{j,u}^{(n)}\right|^2}{1 + I_{m,k}^{(n)}}.$$

Combining the first implementation or the second implementation of the first aspect of the disclosure, in a third implementation, calculating the beamforming vector corresponding to the data to be transmitted to each user in each subchannel of the cell that the transmitter belongs to and the interference matrix of the cell that the transmitter belongs to the other transmitter includes:

setting $\lambda_m = (\lambda_m^{min} + \lambda_m^{max})/2$, where in calculating the beamforming vector corresponding to the data to be transmitted to each user in each subchannel of the cell that the transmitter belongs to and the interference matrix of the cell that the transmitter belongs to the other transmitter for the first time, $\lambda_m^{max}$ is a preset maximum Lagrange duality variable, and $\lambda_m^{min}$ is a preset minimum Lagrange duality variable; and determining whether the preset operational-stop condition is satisfied currently includes:

determining whether a difference between $\lambda_m^{max}$ and $\lambda_m^{min}$ is smaller than a preset threshold currently;

in a case that the difference between $\lambda_m^{max}$ and $\lambda_m^{min}$ is smaller than the preset threshold currently, determining that the preset operational-stop condition is satisfied currently; and in a case that the difference between $\lambda_m^{max}$ and $\lambda_m^{min}$ is not smaller than the preset threshold currently, determining whether $$\sum_{n \in N} \sum_{k \in B_m^{(n)}} p_{m,k}^{(n)} > P_m$$

is satisfied currently, determining that the preset stop condition is not satisfied currently and setting $\lambda_m^{min}$ to be equal to $$\lambda_m \text{ if } \sum_{n \in N} \sum_{k \in B_m^{(n)}} p_{m,k}^{(n)} > P_m,$$

and determining that the preset stop condition is not satisfied currently and setting $\lambda_m^{max}$ to be equal to $\lambda_m$ if $$\sum_{n \in N} \sum_{k \in B_m^{(n)}} p_{m,k}^{(n)} \leq P_m,$$

where $P_m$ represents a maximum transmission power of the transmitter, and $p_{m,k}^{(n)}=(1+I_{m,k}^{n})\phi_{m,k}^{(n)}\phi_{m,k}^{(n)}$, $\phi_{m,k}^{(n)}=\|\vec{T}_{m,k}^{(n)}h_{m,k}^{(n)}\|^2 r_{m,k}^{(n)}$.

Combining the first aspect, the first implementation of the first aspect or the second implementation of the first aspect, in a fourth implementation, determining whether the preset operational-stop condition is satisfied currently includes: determining whether the current accumulative number of times for determination succeeds a preset threshold, determining that the preset operational-stop condition is satisfied currently if the current accumulative number of times for determination succeeds the preset threshold, and determining that the preset operational-stop condition is not satisfied currently if the current accumulative number of times for determination does not succeed the preset threshold.

In a second aspect of the disclosure, a transmitter is provided, including:

a transmitting unit, configured to transmit channel coefficient matrix information of a cell that the transmitter belongs to other transmitter performing coordinated beamforming with the transmitter, where the channel coefficient matrix information of the cell that the transmitter belongs to includes a channel coefficient matrix for each user in each subchannel of the cell that the transmitter belongs to;

an acquiring unit, configured to acquire channel coefficient matrix information of the other transmitter, where the channel coefficient matrix information of the other transmitter includes a channel coefficient matrix for each user in each subchannel of the other transmitter;

a calculation unit, configured to calculate a beamforming vector corresponding to data to be transmitted to each user in each subchannel of the cell that the transmitter belongs to and an interference matrix of the cell that the transmitter belongs to the other transmitter according to the channel coefficient matrix for each user in each subchannel of the cell that the transmitter belongs to and the channel coefficient matrix information of the other transmitter;

where the transmitting unit is further configured to transmit the interference matrix of the cell that the transmitter belongs to the other transmitter to the other transmitter, so that the next transmitter performing coordinated beamforming with the transmitter updates the beamforming vector of the next transmitter and an interference matrix of the next transmitter to other cell, and the acquiring unit is further configured to acquire an interference matrix of the other transmitter to the cell that the transmitter belongs to updated by the other transmitter;

an updating unit, configured to, when the transmitter is polled to perform calculation, update the beamforming vector corresponding to the data to be transmitted to each user in each subchannel of the cell that the transmitter belongs to according to a last acquired interference matrix of the other transmitter to the cell that the transmitter belongs to;

a determining unit, configured to determine whether a preset operational-stop condition is satisfied currently;

a transmission processing unit, configured to transmit the data of each user according to the beamforming vector corresponding to the data to be transmitted to each user in each subchannel of the cell that the transmitter belongs to which is last updated by the updating unit, in a case that the determining unit determines that the preset operational-stop condition is satisfied currently;

where the calculation unit is further configured to, in a case that the determining unit determines that the preset operational-stop condition is not satisfied currently, calculate the interference matrix of the cell that the transmitter belongs to the other transmitter according to the beamforming vector corresponding to the data to be transmitted to each user in each subchannel of the cell that the transmitter belongs to updated by the updating unit, and trigger the transmitting unit to transmit the interference matrix of the cell that the transmitter belongs to the other transmitter calculated by the calculation unit to the other transmitter.

Combining the second aspect of the disclosure, in a first implementation, the calculation unit is configured to calculate the beamforming vector corresponding to the data to be transmitted to each user in each subchannel of the cell that the transmitter belongs to according to a first formula and a second formula, where the first formula is $w_{m,k}^{(n)}=\vec{T}_{m,k}^{(n)}h_{m,k}^{(n)}\sqrt{(1+I_{m,k}^{(n)})\phi_{m,k}^{(n)}r_{m,k}^{(n)}}$, and the second formula is $$I_{m,k}^{(n)} = \sum_{k' \in B_m^{(n)} \backslash k} \left|\vec{h}_{m,k}^{(n)} w_{m,k'}^{(n)}\right|^2 + \sum_{j \in M \backslash n} \sum_{u \in B_j^{(n)}} \left|\vec{h}_{j,k}^{(n)} w_{j,u}^{(n)}\right|^2,$$

where in the first formula, $$\phi_{m,k}^{(n)} = \left[\left[U_{m,k}^{(n)}\left(\frac{1+I_{m,k}^{(n)}}{\vec{h}_{m,k}^{(n)} \vec{T}_{m,k}^{(n)} h_{m,k}^{(n)}}\right)\right]'\right]^{-1},$$

$$r_{m,k}^{(n)} = \frac{1}{\left(\vec{h}_{m,k}^{(n)} \vec{T}_{m,k}^{(n)} h_{m,k}^{(n)}\right)^2}, \text{ and}$$

$$\vec{T}_{m,k}^{(n)} = L_{m,k}^{(n)} + \lambda_m E_{m,k}^{(n)},$$

where $L_{m,k}^{(n)} = \sum_{k' \in B_m^{(n)} \backslash k} \pi_{m,k'}^{(n)} h_{m,k'}^{(n)} \vec{h}_{m,k'}^{(n)} + \sum_{j \in M \backslash n} \sum_{u \in B_j^{(n)}} \pi_{j,u}^{(n)} h_{m,u}^{(n)} \vec{h}_{m,u}^{(n)},$ $$\pi_{m,k}^{(n)} = (U_{m,k}^{(n)})' \frac{\left|\vec{h}_{m,k}^{(n)} w_{m,k}^{(n)}\right|^2}{(1+I_{m,k}^{(n)})^2}, \text{ and}$$

$$T_{m,k}^{(n)} w_{m,k}^{(n)} = \left[U_{m,k}^{(n)}\left(\frac{\left|\vec{h}_{m,k}^{(n)} w_{m,k}^{(n)}\right|^2}{1+I_{m,k}^{(n)}}\right)\right]' \frac{h_{m,k}^{(n)} \vec{h}_{m,k}^{(n)} w_{m,k}^{(n)}}{1+I_{m,k}^{(n)}};$$

and calculate the interference matrix of the cell that the transmitter belongs to the other transmitter according to a third formula, where the third formula is $$I_{m,u}^{(n)out,j} = \sum_{k \in B_m^{(n)}} \left|\vec{h}_{m,u}^{(n)} w_{m,k}^{(n)}\right|^2,$$

where $u \in B_j^{(n)};$ in the formulas, m represents the transmitter, M represents a set of transmitters performing coordinated beamforming, M\m represents a set of transmitters except the transmitter, $B_m^{(n)}$ represents a set of users scheduled by the transmitter in a subchannel n, $B_m^{(n)}\backslash k$ represents a set of users $B_m^{(n)}$ except a user k, $w_{m,k}^{(n)}$ represents a beamforming vector corresponding to data to be transmitted to the user k by the transmitter in the subchannel n, $\vec{w}_{m,k}^{(n)}$ represents a conjugate of $w_{m,k}^{(n)}$, $h_{m,k}^{(n)}$ represents a channel coefficient matrix between the transmitter and the user k in the subchannel n, $\vec{h}_{m,k}^{(n)}$ represents a conjugate of $h_{m,k}^{(n)}$, $\lambda_m$ represents a Lagrange duality variable of the transmitter, $U_{m,k}^{(n)}$ represents a utility function corresponding to data transmitted to the user k by the transmitter in the subchannel n; and the updating unit is configured to update the beamforming vector corresponding to the data to be transmitted to each user in each subchannel of the cell that the transmitter belongs to according to the interference matrix of the other transmitter to the cell that the transmitter belongs to which is last acquired by the acquiring unit, by using the first formula and the second formula.

Combining the first implementation of the second aspect of the disclosure, in a second implementation, the calculation unit is configured to set $\lambda_m = (\lambda_m^{min} + \lambda_m^{max})/2$, where in calculating the beamforming vector corresponding to the data to be transmitted to each user in each subchannel of the cell that the transmitter belongs to and the interference matrix of the cell that the transmitter belongs to the other transmitter by the calculation unit for the first time, $\lambda_m^{max}$ is a preset maximum Lagrange duality variable, and $\lambda_m^{min}$ is a preset minimum Lagrange duality variable; and the determining unit is configured to determine whether a difference between $\lambda_m^{max}$ and $\lambda_m^{min}$ is smaller than a preset threshold currently, determine that the preset operational-stop condition is satisfied currently in a case that the difference between $\lambda_m^{max}$ and $\lambda_m^{min}$ is smaller than the preset threshold currently, and determine that the operational-stop condition is not satisfied currently in a case that the difference between $\lambda_m^{max}$ and $\lambda_m^{min}$ is not smaller than the preset threshold currently;

the determining unit further includes:

a determining subunit, configured to determine whether $$\sum_{n \in N} \sum_{k \in B_m^{(n)}} p_{m,k}^{(n)} > P_m$$

is satisfied currently in a case that it is determined that the difference between $\lambda_m^{max}$ and $\lambda_m^{min}$ is not smaller than the preset threshold currently; and an assigning unit, configured to set $\lambda_m^{min}$ to be equal to $\lambda_m$ in a case that the determining subunit determines that $$\sum_{n \in N} \sum_{k \in B_m^{(n)}} p_{m,k}^{(n)} > P_m$$

is satisfied currently, and set $\lambda_m^{max}$ to be equal to $\lambda_m$ in a case that the determining subunit determines that $$\sum_{n \in N} \sum_{k \in B_m^{(n)}} p_{m,k}^{(n)} \le P_m$$

is satisfied currently, where $P_m$ represents a maximum transmission power of the transmitter, where $p_{m,k}^{(n)} = (1+I_{m,k}^{n})\phi_{m,k}^{(n)}\phi_{m,k}^{(n)}$, $\phi_{m,k}^{(n)} = \|\vec{T}_{m,k}^{(n)} h_{m,k}^{(n)}\|^2 r_{m,k}^{(n)}$.

Combining the second aspect of the disclosure or the first implementation of the second aspect of the disclosure, in a third implementation, the determining unit is configured to determine whether the current accumulative number of times for determination succeeds a preset threshold, determine that the preset operational-stop condition is satisfied currently if the current accumulative number of times for determination succeeds the preset threshold, and determining that the preset operational-stop condition is not satisfied currently if the current accumulative number of times for determination does not succeed the preset threshold.

In a third aspect of the disclosure, a distributed beamforming system is provided, including:

at least two transmitters performing coordinated calculation, where the transmitter is configured to: transmit channel coefficient matrix information of a cell that the transmitter belongs to other transmitter performing coordinated beamforming with the transmitter, where the channel coefficient matrix information of the cell that the transmitter belongs to includes a channel coefficient matrix for each user in each subchannel of the cell that the transmitter belongs to;

acquire channel coefficient matrix information of the other transmitter, where the channel coefficient matrix information of the other transmitter includes a channel coefficient matrix for each user in each subchannel of the other transmitter;

calculate a beamforming vector corresponding to data to be transmitted to each user in each subchannel of the cell that the transmitter belongs to and an interference matrix of the cell that the transmitter belongs to the other transmitter according to the channel coefficient matrix for each user in each subchannel of the cell that the transmitter belongs to and the channel coefficient matrix information of the other transmitter;

transmit the interference matrix of the cell that the transmitter belongs to the other transmitter to the other transmitter, so that the next transmitter performing the coordinated beamforming with the transmitter updates the beamforming vector of the next transmitter and an interference matrix of the next transmitter to other cell;

acquire an interference matrix of the other transmitter to the cell that the transmitter belongs to updated by the other transmitter;

when the transmitter is polled to perform calculation, update the beamforming vector corresponding to the data to be transmitted to each user in each subchannel of the cell that the transmitter belongs to according to a last acquired interference matrix of the other transmitter to the cell that the transmitter belongs to; and determine whether a preset operational-stop condition is satisfied currently; in a case that the preset operational-stop condition is satisfied currently, transmit the data of each user according to a last updated beamforming vector corresponding to the data to be transmitted to each user in each subchannel of the cell that the transmitter belongs to; and in a case that the preset operational-stop condition is not satisfied currently, calculate the interference matrix of the cell that the transmitter belongs to the other transmitter according to the updated beamforming vector corresponding to the data to be transmitted to each user in each subchannel of the cell that the transmitter belongs to, and repeatedly perform the processes of transmitting the interference matrix of the cell that the transmitter belongs to the other transmitter to the other transmitter, acquiring the interference matrix of the other transmitter to the cell that the transmitter belongs to updated by the other transmitter, updating the beamforming vector corresponding to the data to be transmitted to each user in each subchannel of the cell that the transmitter belongs to, and determining whether the preset operational-stop condition is satisfied currently.

Combining the third aspect of the disclosure, in a first implementation, calculating the beamforming vector corresponding to the data to be transmitted to each user in each subchannel of the cell that the transmitter belongs to and the interference matrix of the other transmitter to the cell that the transmitter belongs to according to the channel coefficient matrix for each user in each subchannel of the cell that the transmitter belongs to and the channel coefficient matrix information of the other transmitter includes:

calculating the beamforming vector corresponding to the data to be transmitted to each user in each subchannel of the cell that the transmitter belongs to according to a first formula and a second formula, where the first formula is $w_{m,k}^{(n)} = \vec{T}_{m,k}^{(n)} h_{m,k}^{(n)} \sqrt{(1+I_{m,k}^{(n)}) \phi_{m,k}^{(n)} r_{m,k}^{(n)}}$, and the second formula is $$I_{m,k}^{(n)} = \sum_{k' \in B_m^{(n)} \setminus k} \left| \vec{h}_{m,k}^{(n)} w_{m,k'}^{(n)} \right|^2 + \sum_{j \in M \setminus n} \sum_{u \in B_j^{(n)}} \left| \vec{h}_{j,k}^{(n)} w_{j,u}^{(n)} \right|^2,$$

where in the first formula, $$\phi_{m,k}^{(n)} = \left[ \left[ U_{m,k}^{(n)} \left( \frac{1 + I_{m,k}^{(n)}}{\vec{h}_{m,k}^{(n)} \vec{T}_{m,k}^{(n)} h_{m,k}^{(n)}} \right) \right]' \right]^{-1},$$

$$r_{m,k}^{(n)} = \frac{1}{\left( \vec{h}_{m,k}^{(n)} \vec{T}_{m,k}^{(n)} h_{m,k}^{(n)} \right)^2}, \text{ and}$$

$$\vec{T}_{m,k}^{(n)} = L_{m,k}^{(n)} + \lambda_m E_{m,k}^{(n)},$$

where $L_{m,k}^{(n)} = \sum_{k' \in B_m^{(n)} \setminus k} \pi_{m,k'}^{(n)} h_{m,k'}^{(n)} \vec{h}_{m,k'}^{(n)} + \sum_{j \in M \setminus n} \sum_{u \in B_j^{(n)}} \pi_{j,u}^{(n)} h_{m,u}^{(n)} \vec{h}_{m,u}^{(n)},$ $$\pi_{m,k}^{(n)} = (U_{m,k}^{(n)})' \frac{\left| \vec{h}_{m,k}^{(n)} w_{m,k}^{(n)} \right|^2}{(1 + I_{m,k}^{(n)})^2}, \text{ and}$$

$$T_{m,k}^{(n)} w_{m,k}^{(n)} = \left[ U_{m,k}^{(n)} \left( \frac{\left| \vec{h}_{m,k}^{(n)} w_{m,k}^{(n)} \right|^2}{1 + I_{m,k}^{(n)}} \right) \right]' \frac{h_{m,k}^{(n)} \vec{h}_{m,k}^{(n)} w_{m,k}^{(n)}}{1 + I_{m,k}^{(n)}};$$

and calculating the interference matrix of the cell that the transmitter belongs to the other transmitter according to a third formula, where the third formula is $$I_{m,u}^{(n)out,j} = \sum_{k \in B_m^{(n)}} \left| \vec{h}_{m,u}^{(n)} w_{m,k}^{(n)} \right|^2,$$

where $u \in B_j^{(n)}$;

in the formulas, m represents the transmitter, M represents a set of transmitters performing coordinated beamforming, M\m represents a set of transmitters except the transmitter, $B_m^{(n)}$ represents a set of users scheduled by the transmitter in a subchannel n, $B_m^{(n)} \setminus k$ represents a set of users $B_m^{(n)}$ except a user k, $w_{m,k}^{(n)}$ represents a beamforming vector corresponding to data to be transmitted to the user k by the transmitter in the subchannel n, $\vec{w}_{m,k}^{(n)}$ represents a conjugate of $w_{m,k}^{(n)}$, $h_{m,k}^{(n)}$ represents a channel coefficient matrix between the transmitter and the user k in the subchannel n, $\vec{h}_{m,k}^{(n)}$ represents a conjugate of $h_{m,k}^{(n)}$, $\lambda_m$ represents a Lagrange duality variable of the transmitter, $U_{m,k}^{(n)}$ represents a utility function corresponding to data transmitted to the user k by the transmitter in the subchannel n; and updating the beamforming vector corresponding to the data to be transmitted to each user in each subchannel of the cell that the transmitter belongs to according to the last acquired interference matrix of the other transmitter to the cell that the transmitter belongs to includes:

updating the beamforming vector corresponding to the data to be transmitted to each user in each subchannel of the cell that the transmitter belongs to according to the last acquired interference matrix of the other transmitter to the cell that the transmitter belongs to by using the first formula and the second formula.

It can be seen from the above that, according to the embodiments of the disclosure, a plurality of transmitters perform coordinated beamforming, and an iterative operation is performed on a beamforming vector corresponding to data to be transmitted to each user in each subchannel of the cell that the transmitter belongs to by using an interference matrix among transmitters, so that interference dimension for each user in each subchannel of the transmitter is compressed in a subspace as small as possible, therefore, dimensions are acquired as many as possible to transfer useful data, channel capacity of the cell is improved, and throughput of the overall system is also improved.

BRIEF DESCRIPTION OF DRAWINGS

To describe the technical solutions for the embodiments of the present disclosure or technical solutions in conventional technology more clearly, the following briefly describes the drawings involved in the embodiments of the present disclosure or in the conventional technology. Apparently, the drawings described below are some embodiments and persons of ordinary skill in the art can derive other drawings according to these drawings without any creative effort.

DETAILED DESCRIPTION OF EMBODIMENTS

Figure 1:
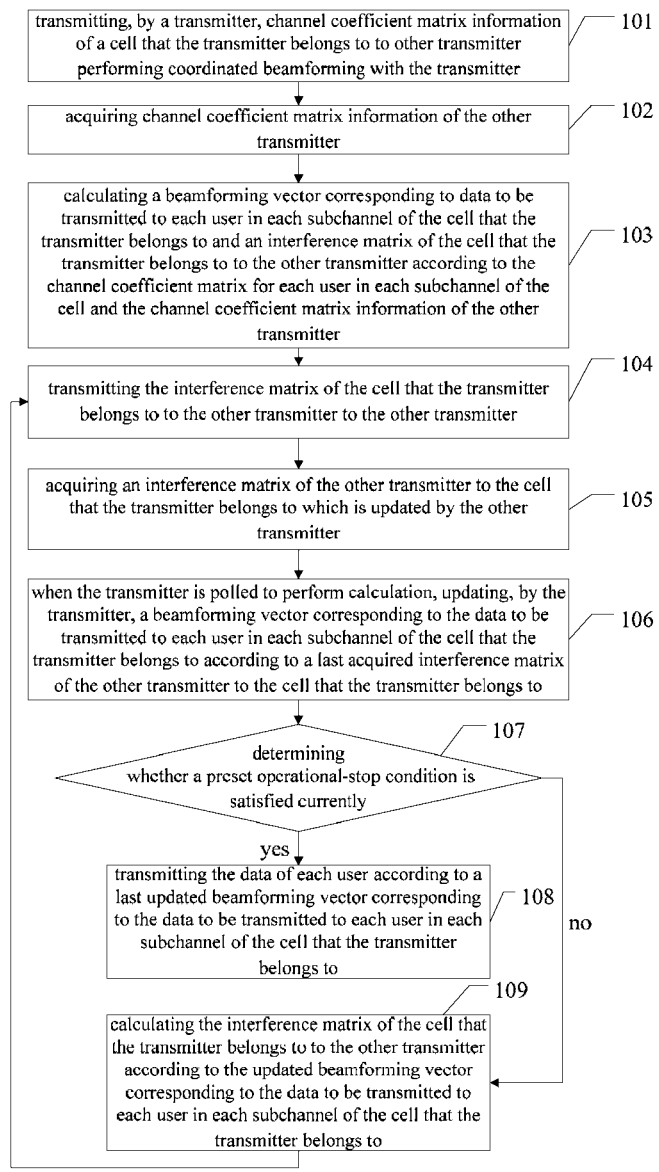
FIG. 1 is a schematic flow chart of a distributed beamforming method provided according to an embodiment of the disclosure.

A distributed beamforming method, a transmitter and a relevant system are provided according to embodiments of the disclosure.

To make the purpose, features and advantages of the disclosure more obvious and understandable, technical solutions according to the embodiments of the disclosure will be described completely and clearly with the following drawings of the embodiments of the disclosure. Apparently, the described embodiments are merely a few rather than all of the embodiments of the present disclosure. Based on the embodiments of the present disclosure, all other embodiments obtained by persons of ordinary skill in the art without creative efforts shall fall within the protection scope of the present disclosure.

A system module formula of a multi-transmitter multi-user distributed system is $$y_{m,k}^{(n)} = \vec{h}_{m,k}^{(n)} w_{m,k}^{(n)} b_{m,k}^{(n)} + \sum_{k' \in B_m^{(n)} \backslash k} \vec{h}_{m,k}^{(n)} w_{m,k'}^{(n)} b_{m,k'}^{(n)} + \sum_{j \in M \backslash m} \sum_{u \in B_j^{(n)}} \vec{h}_{j,k}^{(n)} w_{j,u}^{(n)} b_{j,u}^{(n)} + z_{m,k}^{(n)},$$

where $h_{m,k}^{(n)}$ represents a channel coefficient matrix between the transmitter and a user k in a subchannel n, $\vec{h}_{m,k}^{(n)}$ is a conjugate of $h_{m,k}^{(n)}$, M represents a set of transmitters, $B_m^{(n)}$ represents a set of users scheduled by the transmitter m in the subchannel n, $w_{m,k}^{(n)}$ represents a beamforming vector corresponding to data to be transmitted to the user k by the transmitter m in the subchannel n, $\vec{w}_{m,k}^{(n)}$ is a conjugate of $w_{m,k}^{(n)}$, $b_{m,k}^{(n)}$ represents data to be transmitted to the user k by the transmitter m in the subchannel n, M\m represents a set of transmitters except the transmitter m, $B_m^{(n)}\backslash k$ represents a set of users $B_m^{(n)}$ except the user k, and $z_{m,k}^{(n)}$ represents white Gaussian noise.

It is assumed that each transmitter has a same number of antennas, and each user has a single antenna, then signal to interference plus noise ratio (SINR) of the transmitter m to the user k in the subchannel n is:

$$O_{m,k}^{(n)} = \frac{\left|\vec{h}_{m,k}^{(n)} w_{m,k}^{(n)}\right|^2}{1 + I_{m,k}^{(n)}},$$

$$\text{where } I_{m,k}^{(n)} = \sum_{k' \in B_m^{(n)} \backslash k} \left|\vec{h}_{m,k}^{(n)} w_{m,k'}^{(n)}\right|^2 + \sum_{j \in M \backslash n} \sum_{u \in B_j^{(n)}} \left|\vec{h}_{j,k}^{(n)} w_{j,u}^{(n)}\right|^2.$$

Therefore, interference for each user includes two portions, i.e., intra-cell interference $$\left(\text{i.e., } \sum_{k' \in B_m^{(n)} \backslash k} \left|\vec{h}_{m,k}^{(n)} w_{m,k'}^{(n)}\right|^2\right)$$

and inter-cell interference $$\left(\text{i.e., } \sum_{j \in M \backslash n} \sum_{u \in B_j^{(n)}} \left|\vec{h}_{j,k}^{(n)} w_{j,u}^{(n)}\right|^2\right).$$

An optimization problem as follows is taken into account according to the disclosure.

$$\text{Max} \sum_{m \in M} \sum_{n \in N} \sum_{k \in B_m^{(n)}} U_{m,k}^{(n)}(O_{m,k}^{(n)})$$

$$\text{s.t. } \sum_{n \in N} \sum_{k \in B_m^{(n)}} \vec{w}_{m,k}^{(n)} w_{m,k}^{(n)} \leq P_m.$$

In the above formula, $P_m$ is a maximum transmission power of a base station m, $U_{m,k}^{(n)}$ represents a utility function corresponding to data transmitted to the user k by the transmitter m in the subchannel n, and the form of $U_{m,k}^{(n)}$ may be defined according actual need of the system.

To solve the above optimization problem, a multi-cell multi-user distributed beamforming method is designed according to the disclosure, in which a plurality of transmitters implement joint distributed coordinated beamforming.

The multi-cell multi-user distributed beamforming method according to the embodiment of the disclosure is described in the following. It should be noted that for formulas involved in following embodiments, the same symbol in different formulas represents a same meaning. Referring to FIG. 1, the multi-cell multi-user distributed beamforming method according to the embodiment of the disclosure includes 101 to 109.

101 includes: transmitting, by a transmitter, channel coefficient matrix information of a cell that the transmitter belongs to other transmitter performing coordinated beamforming with the transmitter.

According to the embodiment of the disclosure, transmitters performing coordinated beamforming transmit respective channel coefficient matrix information to each other.

The channel coefficient matrix information of the transmitter includes a channel coefficient matrix for each user in each subchannel of the cell of the transmitter, so that each transmitter may perform coordinated beamforming according to channel coefficient matrix information of other transmitter.

102 includes: acquiring channel coefficient matrix information of the other transmitter.

The channel coefficient matrix information of the other transmitter includes a channel coefficient matrix for each user in each subchannel of the other transmitter.

103 includes: calculating a beamforming vector corresponding to data to be transmitted to each user in each subchannel of the cell that the transmitter belongs to and an interference matrix of the cell that the transmitter belongs to the other transmitter according to the channel coefficient matrix for each user in each subchannel of the cell that the transmitter belongs to and the channel coefficient matrix information of the other transmitter.

It is assumed that the transmitter according to the embodiment of the disclosure is a transmitter m, then for any subchannel n and any user k of the transmitter, the transmitter may calculate the beamforming vector corresponding to the data to be transmitted to each user in each subchannel of the cell that the transmitter belongs to according to a first formula and a second formula, where the first formula is $w_{m,k}^{(n)} = \vec{T}_{m,k}^{(n)} h_{m,k}^{(n)} \sqrt{(1+I_{m,k}^{(n)})\phi_{m,k}^{(n)} r_{m,k}^{(n)}}$, and the second formula is $$I_{m,k}^{(n)} = \sum_{k' \in B_m^{(n)} \setminus k} \left| \vec{h}_{m,k}^{(n)} w_{m,k'}^{(n)} \right|^2 + \sum_{j \in M \setminus n} \sum_{u \in B_j^{(n)}} \left| \vec{h}_{j,k}^{(n)} w_{j,u}^{(n)} \right|^2.$$

In the first formula, $$\phi_{m,k}^{(n)} = \left[ \left[ U_{m,k}^{(n)} \left( \frac{1 + I_{m,k}^{(n)}}{\vec{h}_{m,k}^{(n)} T_{m,k}^{(n)} \vec{h}_{m,k}^{(n)}} \right) \right]' \right]^{-1},$$

$$r_{m,k}^{(n)} = \frac{1}{\left( \vec{h}_{m,k}^{(n)} T_{m,k}^{(n)} \vec{h}_{m,k}^{(n)} \right)^2}, \text{ and}$$

$$\vec{T}_{m,k}^{(n)} = L_{m,k}^{(n)} + \lambda_m E_{m,k}^{(n)},$$

where $L_{m,k}^{(n)} =$ $$\sum_{k' \in B_m^{(n)} \setminus k} \pi_{m,k'}^{(n)} h_{m,k'}^{(n)} \vec{h}_{m,k'}^{(n)} + \sum_{j \in M \setminus n} \sum_{u \in B_j^{(n)}} \pi_{j,u}^{(n)} h_{m,u}^{(n)} \vec{h}_{m,u}^{(n)},$$

$$\pi_{m,k}^{(n)} = (U_{m,k}^{(n)})' \frac{\left| \vec{h}_{m,k}^{(n)} w_{m,k}^{(n)} \right|^2}{(1 + I_{m,k}^{(n)})^2}, \text{ and}$$

$$T_{m,k}^{(n)} w_{m,k}^{(n)} = \left[ U_{m,k}^{(n)} \left( \frac{\left| \vec{h}_{m,k}^{(n)} w_{m,k}^{(n)} \right|^2}{(1 + I_{m,k}^{(n)})^2} \right) \right]' \frac{h_{m,k}^{(n)} \vec{h}_{m,k}^{(n)} w_{m,k}^{(n)}}{1 + I_{m,k}^{(n)}}.$$

The interference matrix of the cell that the transmitter belongs to the other transmitter is calculated according to a third formula, where the third formula is $$I_{m,u}^{(n)out,j} = \sum_{k \in B_m^{(n)}} \left| \vec{h}_{m,u}^{(n)} w_{m,k}^{(n)} \right|^2, \text{ where } u \in B_j^{(n)}.$$

In the foregoing formulas, M represents a set of transmitters performing coordinated beamforming, M\m represents a set of transmitters except the transmitter m, $B_m^{(n)}$ represents a set of users scheduled by the transmitter m in a subchannel n, $B_m^{(n)}\setminus k$ represents a set of users $B_m^{(n)}$ except a user k, $w_{m,k}^{(n)}$ represents a beamforming vector corresponding to data to be transmitted to the user k by the transmitter m in the subchannel n, $\vec{w}_{m,k}^{(n)}$ represents a conjugate of $w_{m,k}^{(n)}$, $h_{m,k}^{(n)}$ represents a channel coefficient matrix between the transmitter m and the user k in the subchannel n, $\vec{h}_{m,k}^{(n)}$ represents a conjugate of $h_{m,k}^{(n)}$, $\lambda_m$ represents a Lagrange duality variable of the transmitter, $U_{m,k}^{(n)}$ represents a utility function corresponding to data transmitted to the user k by the transmitter m in the subchannel n, and the $U_{m,k}^{(n)}$ has different forms for different optimization objectives. For example, the $U_{m,k}^{(n)}$ may have following forms:

$$U_{m,k}^{(n)}(O_{m,k}^{(n)}) = w_{m,k}^{(n)} \log(O_{m,k}^{(n)}), \text{ or}$$

$$U_{m,k}^{(n)}(O_{m,k}^{(n)}) = \log(1 + O_{m,k}^{(n)}), \text{ or}$$

-continued $$U_{m,k}^{(n)}(O_{m,k}^{(n)}) = \begin{cases} \log(O_{m,k}^{(n)}) & a = 1 \\ (1-a)^{-1}(O_{m,k}^{(n)})^{1-a} & a \neq 1 \end{cases}.$$

104 includes: transmitting the interference matrix of the cell that the transmitter belongs to the other transmitter to the other transmitter.

After the interference matrix of the cell that the transmitter belongs to the other transmitter is calculated, the transmitter transmits the interference matrix of the cell that the transmitter belongs to the other transmitter to the other transmitter performing coordinated beamforming with the transmitter, so that the next transmitter performing coordinated calculation with the transmitter updates the beamforming vector of the next transmitter and an interference matrix of the next transmitter to other cell. The implementation way that the next transmitter updates its beamforming vector and the interference matrix of the next transmitter to other cell may refer to the method in step 103.

105 includes: acquiring an interference matrix of the other transmitter to the cell that the transmitter belongs to which is updated by the other transmitter.

106 includes: when the transmitter is polled to perform calculation, updating, by the transmitter, the beamforming vector corresponding to the data to be transmitted to each user in each subchannel of the cell that the transmitter belongs to according to a last acquired interference matrix of the other transmitter to the cell that the transmitter belongs to.

According to the embodiment of the disclosure, the beamforming vector corresponding to the data to be transmitted to each user in each subchannel of the cell that the transmitter belongs to may be updated according to the last acquired interference matrix of the other transmitter to the cell that the transmitter belongs to by using the first formula and the second formula.

107 includes: determining whether a preset operational-stop condition is satisfied currently.

After the transmitter updates the beamforming vector corresponding to the data to be transmitted to each user in each subchannel of the cell that the transmitter belongs to, whether the preset operational-stop condition is satisfied currently is determined. If the preset operational-stop condition is satisfied currently, step 108 is executed, and if the preset operational-stop condition is not satisfied currently, step 109 is executed.

In an application scenario, determining whether a preset operational-stop condition is satisfied currently may include: determining whether the current accumulative number of times for determination succeeds a preset threshold, determine that the preset operational-stop condition is satisfied currently if the current accumulative number of times for determination succeeds the preset threshold, and determining that the preset operational-stop condition is not satisfied currently if the current accumulative number of times for determination does not succeed the preset threshold.

In another application scenario, in a case that the transmitter executes step 103 for the first time, $\lambda_m^{max}$ and $\lambda_m^{min}$ may be initialized. A great value is assigned to $\lambda_m^{max}$, and $\lambda_m^{max}$ is used as a maximum Lagrange duality variable. A small value is assigned to $\lambda_m^{min}$, and $\lambda_m^{min}$ is used as a minimum Lagrange duality variable. $\lambda_m = (\lambda_m^{min} + \lambda_m^{max})/2$ is set. In this case, determining whether a preset operational-stop condition is satisfied currently may include: determining whether a difference between $\lambda_m^{max}$ and $\lambda_m^{min}$ is smaller than a preset threshold currently; in a case that the difference between $\lambda_m^{max}$ and $\lambda_m^{min}$ is smaller than the preset threshold currently, determining that the preset operational-stop condition is satisfied currently; and in a case that the difference between $\lambda_m^{max}$ and $\lambda_m^{min}$ is not smaller than the preset threshold currently, determining that the preset stop condition is not satisfied currently, and determining whether $$\sum_{n \in N} \sum_{k \in B_m^{(n)}} p_{m,k}^{(n)} > P_m$$

is satisfied currently, setting $\lambda_m^{min}$ to be equal to $\lambda_m$ and maintaining $$\lambda_m^{max} \text{ if } \sum_{n \in N} \sum_{k \in B_m^{(n)}} p_{m,k}^{(n)} > P_m,$$

and setting $\lambda_m^{max}$ to be equal to $\lambda_m$ and maintaining $\lambda_m^{min}$ if $$\sum_{n \in N} \sum_{k \in B_m^{(n)}} p_{m,k}^{(n)} \leq P_m.$$

108 includes: transmitting the data of each user according to the last updated beamforming vector corresponding to the data to be transmitted to each user in each subchannel of the cell that the transmitter belongs to.

109 includes: calculating the interference matrix of the cell that the transmitter belongs to the other transmitter according to the updated beamforming vector corresponding to the data to be transmitted to each user in each subchannel of the cell that the transmitter belongs to;

if it is determined that the preset operational-stop condition is not satisfied currently, the interference matrix of the cell that the transmitter belongs to the other transmitter is calculated according to the last updated beamforming vector corresponding to the data to be transmitted to each user in each subchannel of the cell that the transmitter belongs to, and step 104 is returned to. Specifically, the implementation way that the transmitter calculates the interference matrix of the cell that the transmitter belongs to the other transmitter may refer to the method in step 103.

According to the embodiment of the disclosure, for algorithm convergence, it needs to be ensured that for each transmitter performing coordinated beamforming, only one transmitter is allowed to update its beamforming vector each time (i.e., step 106 according to the embodiment of the disclosure). In practice, to ensure that only one transmitter is allowed to update its beamforming vector each time, the following way may be adopted. Each transmitter performing coordinated beamforming is numbered, and numbers of each transmitter are aligned to different time points in one calculation cycle. Intervals between the different time points are set according to actual processing ability of the transmitter. For example, there are transmitters 1-4, time points 1-4 may be set in one calculation cycle, and the transmitters 1-4 are aligned to the time points 1-4 respectively. When the time point 1 of the calculation cycle is reached, it is indicated that currently it is the transmitter 1's turn to update its beamforming vector, and when the time point 2 of the calculation cycle is reached, it is indicated that currently it is the transmitter 2's turn to update its beamforming vector, and so on. Alternatively, according to the embodiment of the disclosure, after one transmitter updates its beamforming vector, an interference matrix of the cell that the one transmitter belongs to other transmitter is calculated according to the updated beamforming vector and transmitted to the other transmitter if the stop condition is not satisfied, therefore, the transmitter may determine whether currently it is its turn to locally update its beamforming vector according to the number of times of receiving the interference matrix from other transmitter under a condition that the transmitter learns the number of transmitters in the set of transmitters performing coordinated beamforming. For example, there are transmitters 1-4, and the transmitter 1 is taken as an example. It is assumed that the transmitter 1 updates its beamforming vector firstly, and the transmitter 2, the transmitter 3 and the transmitter 4 update their beamforming vectors in sequence. After the transmitter 1 acquires the interference matrix of the transmitter 4 to the transmitter 1 from the transmitter 4 (i.e., after the transmitter 1 acquires the interference matrix of other transmitter to the cell that the transmitter 1 belongs to from the other transmitter for the third time), the transmitter 1 may determine that currently it is its turn to update its beamforming vector. Other ways may also be adopted to ensure that the only one transmitter is allowed to update its beamforming vector each time, which is not limited herein.

It should be noted that to facilitate description, one transmitter is taken as an execution subject for description, and the execution process of the method of other transmitters in the system may refer to the description according to the above embodiment. In the embodiment of the disclosure, the user refers to a user equipment (UE), and the transmitter may be a base station, a relay station, or a combination of a base station and a relay station, which is not limited herein.

It can be seen from the above that, according to the embodiment of the disclosure, a plurality of transmitters perform coordinated beamforming, and an iterative operation is performed on a beamforming vector corresponding to data to be transmitted to each user in each subchannel of the cell that the transmitter belongs to by using an interference matrix among transmitters, so that interference dimension for each user in each subchannel of the transmitter is compressed in a subspace as small as possible, therefore, dimensions are acquired as many as possible to transfer useful data, channel capacity of the cell is improved, and throughput of the overall system is also improved.

Figure 2:
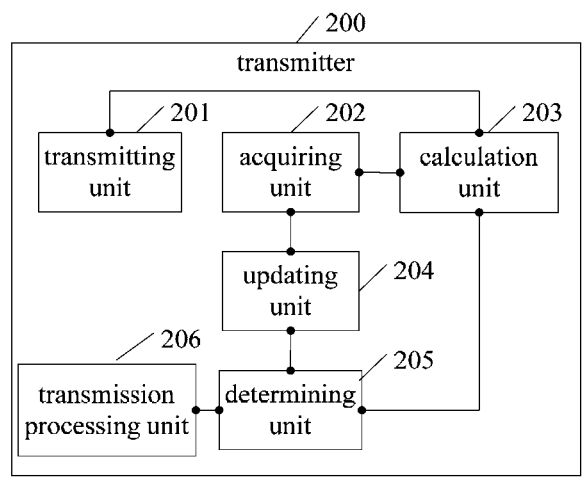
FIG. 2 is a schematic structural diagram of a transmitter provided according to an embodiment of the disclosure.

A transmitter according to an embodiment of the disclosure is described in the following. Referring to FIG. 2, the transmitter 200 according to the embodiment of the disclosure includes following units 201 to 206.

A transmitting unit 201 is configured to transmit channel coefficient matrix information of a cell that the transmitter 200 belongs to other transmitter performing coordinated beamforming with the transmitter 200, where the channel coefficient matrix information of the cell that the transmitter belongs to includes a channel coefficient matrix for each user in each subchannel of the cell that the transmitter belongs to.

An acquiring unit 202 is configured to acquire channel coefficient matrix information of the other transmitter, where the channel coefficient matrix information of the other transmitter includes a channel coefficient matrix for each user in each subchannel of the other transmitter.

A calculation unit 203 is configured to calculate a beamforming vector corresponding to data to be transmitted to each user in each subchannel of the cell that the transmitter belongs to and an interference matrix of the cell that the transmitter belongs to the other transmitter according to the channel coefficient matrix for each user in each subchannel of the cell that the transmitter belongs to and the channel coefficient matrix information of the other transmitter.

Specifically, the calculation unit 203 calculates the beamforming vector corresponding to the data to be transmitted to each user in each subchannel of the cell that the transmitter belongs to according to a first formula and a second formula, where the first formula is $w_{m,k}^{(n)} = \vec{T}_{m,k}^{(n)} h_{m,k}^{(n)} / \sqrt{(1+I_{m,k}^{(n)})\phi_{m,k}^{(n)} r_{m,k}^{(n)}}$, and the second formula is $$I_{m,k}^{(n)} = \sum_{k' \in B_m^{(n)} \backslash k} \left| \vec{h}_{m,k}^{(n)} w_{m,k'}^{(n)} \right|^2 + \sum_{j \in M \backslash m} \sum_{u \in B_j^{(n)}} \left| \vec{h}_{j,k}^{(n)} w_{j,u}^{(n)} \right|^2.$$

In the first formula, $$\phi_{m,k}^{(n)} = \left[ \left[ U_{m,k}^{(n)} \left( \frac{1 + I_{m,k}^{(n)}}{\vec{h}_{m,k}^{(n)} \vec{T}_{m,k}^{(n)} h_{m,k}^{(n)}} \right) \right]' \right]^{-1},$$

$$r_{m,k}^{(n)} = \frac{1}{\left( \vec{h}_{m,k}^{(n)} \vec{T}_{m,k}^{(n)} h_{m,k}^{(n)} \right)^2}, \text{ and}$$

$$\vec{T}_{m,k}^{(n)} = L_{m,k}^{(n)} + \lambda_m E_{m,k}^{(n)},$$

where $L_{m,k}^{(n)} =$ $$\sum_{k' \in B_m^{(n)} \backslash k} \pi_{m,k'}^{(n)} h_{m,k'}^{(n)} \vec{h}_{m,k'}^{(n)} + \sum_{j \in M \backslash m} \sum_{u \in B_j^{(n)}} \pi_{j,u}^{(n)} h_{m,u}^{(n)} \vec{h}_{m,u}^{(n)},$$

$$\pi_{m,k}^{(n)} = (U_{m,k}^{(n)})' \frac{\left| \vec{h}_{m,k}^{(n)} w_{m,k}^{(n)} \right|^2}{(1 + I_{m,k}^{(n)})^2}, \text{ and}$$

$$T_{m,k}^{(n)} w_{m,k}^{(n)} = \left[ U_{m,k}^{(n)} \left( \frac{\left| \vec{h}_{m,k}^{(n)} w_{m,k}^{(n)} \right|^2}{(1 + I_{m,k}^{(n)})} \right) \right]' \frac{h_{m,k}^{(n)} \vec{h}_{m,k}^{(n)} w_{m,k}^{(n)}}{1 + I_{m,k}^{(n)}}.$$

The interference matrix of the cell that the transmitter belongs to the other transmitter is calculated according to a third formula,
where the third formula is $$I_{m,u}^{(n)out,j} = \sum_{k \in B_m^{(n)}} \left| \vec{h}_{m,u}^{(n)} w_{m,k}^{(n)} \right|^2, \text{ where } u \in B_j^{(n)}.$$

In the foregoing formulas, m represents the transmitter 200, M represents a set of transmitters performing coordinated beamforming, M\m represents a set of transmitters except the transmitter 200, $B_m^{(n)}$ represents a set of users scheduled by the transmitter 200 in a subchannel n, $B_m^{(n)}\backslash k$ represents a set of users $B_m^{(n)}$ except a user k, $w_{m,k}^{(n)}$ represents a beamforming vector corresponding to data to be transmitted to the user k by the transmitter 200 in the subchannel n, $\vec{w}_{m,k}^{(n)}$ represents a conjugate of $w_{m,k}^{(n)}$, $h_{m,k}^{(n)}$, represents a channel coefficient matrix between the transmitter 200 and the user k in the subchannel n, $\vec{h}_{m,k}^{(n)}$ represents a conjugate of $h_{m,k}^{(n)}$, $\lambda_m$ represents a Lagrange duality variable of the transmitter 200, $U_{m,k}^{(n)}$ represents a utility function corresponding to data transmitted to the user k by the transmitter 200 in the subchannel n.

The transmitting unit 201 is further configured to transmit the interference matrix of the cell that the transmitter belongs to the other transmitter to the other transmitter, so that the next transmitter performing coordinated calculation with the transmitter 200 updates the beamforming vector of the next transmitter and an interference matrix of the next transmitter to other cell.

The acquiring unit 202 is further configured to acquire the interference matrix of the other transmitter to the cell that the transmitter belongs to which is updated by the other transmitter.

The transmitting unit 200 further includes an updating unit 204, configured to, when the transmitter 200 is polled to perform calculation, update the beamforming vector corresponding to the data to be transmitted to each user in each subchannel of the cell that the transmitter belongs to according to a last acquired interference matrix of the other transmitter to the cell that the transmitter belongs to.

A determining unit 205 is configured to determine whether a preset operational-stop condition is satisfied currently.

In an application scenario, the determining unit 205 is configured to determine whether the current accumulative number of times for determination succeeds a preset threshold, determine that the preset operational-stop condition is satisfied currently if the current accumulative number of times for determination succeeds the preset threshold, and determine that the preset operational-stop condition is not satisfied currently if the current accumulative number of times for determination does not succeed the preset threshold.

In another application scenario, the calculation unit 203 is configured to set $\lambda_m = (\lambda_m^{min} + \lambda_m^{max})/2$, where in calculating the beamforming vector corresponding to the data to be transmitted to each user in each subchannel of the cell that the transmitter belongs to and the interference matrix of the cell that the transmitter belongs to the other transmitter by the calculation unit 203 for the first time, $\lambda_m^{max}$ is a preset maximum Lagrange duality variable, and $\lambda_m^{min}$ is a preset minimum Lagrange duality variable. The determining unit 203 is configured to determine whether a difference between $\lambda_m^{max}$ and $\lambda_m^{min}$ is smaller than a preset threshold currently, determine that the preset operational-stop condition is satisfied currently in a case that the difference between $\lambda_m^{max}$ and $\lambda_m^{min}$ is smaller than the preset threshold currently, and determine that the operational-stop condition is not satisfied currently in a case that the difference between $\lambda_m^{max}$ and $\lambda_m^{min}$ is not smaller than the preset threshold currently. The determining unit 203 further includes a determining subunit, configured to determine whether $$\sum_{n \in N} \sum_{k \in B_m^{(n)}} p_{m,k}^{(n)} > P_m$$

is satisfied currently in a case that it is determined that the difference between $\lambda_m^{max}$ and $\lambda_m^{min}$ is not smaller than the preset threshold currently; and an assigning unit, configured to set $\lambda_m^{min}$ to be equal to $\lambda_m$ and maintain $\lambda_m^{max}$ in a case that the determining subunit determines that $$\sum_{n \in N} \sum_{k \in B_m^{(n)}} p_{m,k}^{(n)} > P_m$$

is satisfied currently, and set $\lambda_m^{max}$ to be equal to $\lambda_m$ and maintain $\lambda_m^{min}$ in a case that the determining subunit determines that $$\sum_{n \in N} \sum_{k \in B_m^{(n)}} p_{m,k}^{(n)} \leq P_m$$

is satisfied currently.

$P_m$ represents a maximum transmission power of the transmitter, where $p_{m,k}^{(n)}=(1+I_{m,k}^{n})\phi_{m,k}^{(n)}\phi_{m,k}^{(n)}$, $\phi_{m,k}^{(n)}=\|\vec{T}_{m,k}^{(n)}h_{m,k}^{(n)}\|^2 r_{m,k}^{(n)}$.

A transmission processing unit 206 is configured to transmit the data of each user according to the beamforming vector corresponding to the data to be transmitted to each user in each subchannel of the cell that the transmitter belongs to which is last updated by the updating unit 204, in a case that the determining unit 205 determines that the preset operational-stop condition is satisfied currently.

The calculation unit 203 is further configured to calculate the interference matrix of the cell that the transmitter belongs to the other transmitter according to the beamforming vector corresponding to the data to be transmitted to each user in each subchannel of the cell that the transmitter belongs to which is updated by the updating unit 204, and trigger the transmitting unit 201 to transmit the interference matrix of the cell that the transmitter belongs to the other transmitter calculated by the calculation unit 203 to the other transmitter, in a case that the determining unit 205 determines that the preset operational-stop condition is not satisfied currently.

It should be noted that in the embodiment of the disclosure, the user refers to a UE, and the transmitter 200 or the other transmitter may be a base station, a relay station or a combination of a base station and a relay station, which is not limited herein.

It should be noted that the transmitter 200 according to the embodiment of the disclosure may be the transmitter in the above device embodiment of the disclosure and may be configured to implement all technical solutions of the above device embodiment. The implementation process of the transmitter 200 may refer to relevant description of the above embodiment, which is not described herein.

It can be seen from the above that, according to the embodiment of the disclosure, a plurality of transmitters perform coordinated beamforming, and an iterative operation is performed on a beamforming vector corresponding to data to be transmitted to each user in each subchannel of the cell that the transmitter belongs to by using an interference matrix among transmitters, so that interference dimension for each user in each subchannel of the transmitter is compressed in a subspace as small as possible, therefore, dimensions are acquired as many as possible to transfer useful data, channel capacity of the cell is improved, and throughput of the overall system is also improved.

A computer storage medium is further provided according to an embodiment of the disclosure. A program is stored in the computer storage medium, and the program executes a part or all of the interference alignment method in the above method embodiment.

Figure 3:
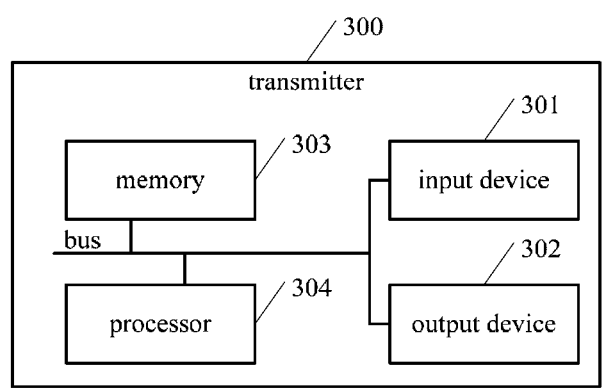
FIG. 3 is a schematic structural diagram of a transmitter provided according to another embodiment of the disclosure.

As shown in FIG. 3, a transmitter 300 according to the embodiment of the disclosure includes:

an input device 301, an output device 302, a memory 303 and a processor 304 (the number of the processor 304 in the transmitter may be one or more, and one processor is taken as an example in FIG. 3). In some embodiment of the disclosure, the input device 301, the output device 302, the memory 303 and the processor 304 may be connected with each other via a bus or in other way. As shown in FIG. 3, bus connection is taken as an example.

The processor 304 executes following steps.

The processor 304 transmits channel coefficient matrix information of a cell that the transmitter 300 belongs to other transmitter performing coordinated beamforming with the transmitter 200, where the channel coefficient matrix information of the cell that the transmitter belongs to includes a channel coefficient matrix for each user in each subchannel of the cell that the transmitter belongs to.

The processor 304 acquires channel coefficient matrix information of the other transmitter, where the channel coefficient matrix information of the other transmitter includes a channel coefficient matrix for each user in each subchannel of the other transmitter.

The processor 304 calculates a beamforming vector corresponding to data to be transmitted to each user in each subchannel of the cell that the transmitter belongs to and an interference matrix of the cell that the transmitter belongs to the other transmitter according to the channel coefficient matrix for each user in each subchannel of the cell that the transmitter belongs to and the channel coefficient matrix information of the other transmitter.

Specifically, the beamforming vector corresponding to the data to be transmitted to each user in each subchannel of the cell that the transmitter belongs to may be calculated according to a first formula and a second formula, where the first formula is $w_{m,k}^{(n)}=\vec{T}_{m,k}^{(n)}h_{m,k}^{(n)}\sqrt{(1+I_{m,k}^{(n)})\phi_{m,k}^{(n)}r_{m,k}^{(n)}}$, and the second formula is $$I_{m,k}^{(n)} = \sum_{k' \in B_m^{(n)}/k} \left|\vec{h}_{m,k}^{(n)}w_{m,k'}^{(n)}\right|^2 + \sum_{j \in M \setminus n}\sum_{u \in B_j^{(n)}} \left|\vec{h}_{j,k}^{(n)}w_{j,u}^{(n)}\right|^2;$$

in the first formula, $$\phi_{m,k}^{(n)} = \left[\left[U_{m,k}^{(n)} = \left(\frac{1+I_{m,k}^{(n)}}{\vec{h}_{m,k}^{(n)}\vec{T}_{m,k}^{(n)}h_{m,k}^{(n)}}\right)\right]'\right]^{-1},$$

$$r_{m,k}^{(n)} = \frac{1}{\left(\vec{h}_{m,k}^{(n)}\vec{T}_{m,k}^{(n)}h_{m,k}^{(n)}\right)^2}, \text{ and}$$

$$\vec{T}_{m,k}^{(n)} = L_{m,k}^{(n)} + \lambda_m E_{m,k}^{(n)},$$

where $L_{m,k}^{(n)} = \sum_{k' \in B_m^{(n)} \setminus k} \pi_{m,k}^{(n)} \cdot h_{m,k}^{(n)} \cdot \vec{h}_{m,k'}^{(n)} + \sum_{j \in M \setminus n}\sum_{u \in B_j^{(n)}} \pi_{j,u}^{(n)} h_{m,u}^{(n)} \vec{h}_{m,u}^{(n)}$, $$\pi_{m,k}^{(n)} = (U_{m,k}^{(n)})' \frac{\left|\vec{h}_{m,k}^{(n)} w_{m,k}^{(n)}\right|^2}{(1+I_{m,k}^{(n)})^2}, \text{ and}$$

-continued $$T_{m,k}^{(n)} w_{m,k}^{(n)} = \left[ U_{m,k}^{(n)} \left( \frac{\left| \vec{h}_{m,k}^{(n)} w_{m,k}^{(n)} \right|^2}{1 + I_{m,k}^{(n)}} \right) \right]' \frac{h_{m,k}^{(n)} \vec{h}_{m,k}^{(n)} w_{m,k}^{(n)}}{1 + I_{m,k}^{(n)}}.$$

The interference matrix of the cell that the transmitter belongs to the other transmitter is calculated according to a third formula,
where the third formula is $$I_{m,u}^{(n)out,j} = \sum_{k \in B_m^{(n)}} \left| \vec{h}_{m,u}^{(n)} w_{m,k}^{(n)} \right|^2, \text{ where } u \in B_j^{(n)}.$$

In the foregoing formulas, m represents the transmitter 300, M represents a set of transmitters performing coordinated beamforming, M\m represents a set of transmitters except the transmitter 300, $B_m^{(n)}$ represents a set of users scheduled by the transmitter 300 in a subchannel n, $B_m^{(n)}\backslash k$ represents a set of users $B_m^{(n)}$ except a user k, $w_{m,k}^{(n)}$ represents a beamforming vector corresponding to data to be transmitted to the user k by the transmitter 300 in the subchannel n, $\vec{w}_{m,k}^{(n)}$ represents a conjugate of $w_{m,k}^{(n)}$, $h_{m,k}^{(n)}$ represents a channel coefficient matrix between the transmitter 300 and the user k in the subchannel n, $\vec{h}_{m,k}^{(n)}$ represents a conjugate of $h_{m,k}^{(n)}$, $\lambda_m$ represents a Lagrange duality variable of the transmitter 300, $U_{m,k}^{(n)}$ represents a utility function corresponding to data transmitted to the user k by the transmitter 300 in the subchannel n.

The processor 304 transmits the interference matrix of the cell that the transmitter belongs to the other transmitter to the other transmitter, so that the next transmitter performing coordinated calculation with the transmitter 200 updates the beamforming vector of the next transmitter and an interference matrix of the next transmitter to other cell.

The processor 304 acquires the interference matrix of the other transmitter to the cell that the transmitter belongs to updated by the other transmitter. When the transmitter 300 is polled to perform calculation, the processor 304 updates the beamforming vector corresponding to the data to be transmitted to each user in each subchannel of the cell that the transmitter belongs to according to a last acquired interference matrix of the other transmitter to the cell that the transmitter belongs to.

The processor 304 determines whether a preset operational-stop condition is satisfied currently.

In a case that the preset operational-stop condition is satisfied currently, the processor 304 transmits the data of each user according to a last updated beamforming vector corresponding to the data to be transmitted to each user in each subchannel of the cell that the transmitter belongs to.

In a case that the preset operational-stop condition is not satisfied currently, the processor 304 calculates the interference matrix of the cell that the transmitter belongs to the other transmitter according to the updated beamforming vector corresponding to the data to be transmitted to each user in each subchannel of the cell that the transmitter belongs to, and repeatedly executes the processes of transmitting the interference matrix of the cell that the transmitter belongs to the other transmitter to the other transmitter, acquiring the interference matrix of the other transmitter to the cell that the transmitter belongs to updated by the other transmitter, updating the beamforming vector corresponding to the data to be transmitted to each user in each subchannel of the cell that the transmitter belongs to, and determining whether the preset operational-stop condition is satisfied currently.

It should be noted that in the embodiment of the disclosure, the user refers to a UE, and the transmitter 300 or the other transmitter may be a base station, a relay station, or a combination of a base station and a relay station, which is not limited herein.

It should be noted that the transmitter 300 according to the embodiment of the disclosure may be the transmitter of the above device embodiment and may be configured to implement all technical solutions of the above device embodiment. The implementation process of the transmitter 300 may refer to relevant description of the above embodiment, which is not described herein.

It can be seen from the above that, according to the embodiment of the disclosure, a plurality of transmitters perform coordinated beamforming, and an iterative operation is performed on a beamforming vector corresponding to data to be transmitted to each user in each subchannel of the cell that the transmitter belongs to by using an interference matrix among transmitters, so that interference dimension for each user in each subchannel of the transmitter is compressed in a subspace as small as possible, therefore, dimensions are acquired as many as possible to transfer useful data, channel capacity of the cell that the transmitter belongs to is improved, and throughput of the overall system is also improved.

Figure 4:
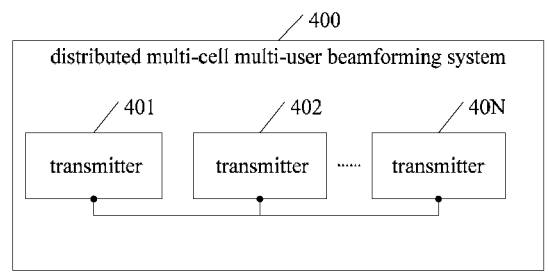
FIG. 4 is a schematic structural diagram of a distributed beamforming system provided according to an embodiment of the disclosure.

A multi-cell multi-user distributed beamforming system is further provided according to an embodiment of the disclosure. As shown in FIG. 4, the distributed beamforming system 400 according to the embodiment of the disclosure includes:

transmitters 401-40N performing coordinated calculation, where N is equal to or greater than 2, and for any transmitter 40n, n∈{1, 2, 3 . . . , N}.

The transmitter 40n is configured to transmit channel coefficient matrix information of a cell that the transmitter 40n belongs to other transmitter performing coordinated beamforming with the transmitter 40n, where the channel coefficient matrix information of the cell that the transmitter belongs to includes a channel coefficient matrix for each user in each subchannel of the cell that the transmitter belongs to.

The transmitter 40n is further configured to acquire channel coefficient matrix information of the other transmitter, where the channel coefficient matrix information of the other transmitter includes a channel coefficient matrix for each user in each subchannel of the other transmitter.

The transmitter 40n is further configured to calculate a beamforming vector corresponding to data to be transmitted to each user in each subchannel of the cell that the transmitter belongs to and an interference matrix of the cell that the transmitter belongs to the other transmitter according to the channel coefficient matrixes for each user in each subchannel of the cell that the transmitter belongs to and the channel coefficient matrix information of the other transmitter.

Specifically, the transmitter calculates the beamforming vector corresponding to the data to be transmitted to each user in each subchannel of the cell that the transmitter belongs to according to a first formula and a second formula, where the first formula is $w_{m,k}^{(n)} = \vec{T}_{m,k}^{(n)} h_{m,k}^{(n)} / \sqrt{(1+I_{m,k}^{(n)})\phi_{m,k}^{(n)} r_{m,k}^{(n)}}$, and
the second formula is $$I_{m,k}^{(n)} = \sum_{k' \in B_m^{(n)}/k} \left| \vec{h}_{m,k}^{(n)} w_{m,k'}^{(n)} \right|^2 + \sum_{j \in M \backslash n} \sum_{u \in B_j^{(n)}} \left| \vec{h}_{j,k}^{(n)} w_{j,u}^{(n)} \right|^2;$$

in the first formula, $$\phi_{m,k}^{(n)} = \left[ \left[ U_{m,k}^{(n)} = \left( \frac{1 + I_{m,k}^{(n)}}{\vec{h}_{m,k}^{(n)} \vec{T}_{m,k}^{(n)} h_{m,k}^{(n)}} \right) \right]' \right]^{-1},$$

$$r_{m,k}^{(n)} = \frac{1}{\left( \vec{h}_{m,k}^{(n)} \vec{T}_{m,k}^{(n)} h_{m,k}^{(n)} \right)^2}, \text{ and}$$

$$\vec{T}_{m,k}^{(n)} = L_{m,k}^{(n)} + \lambda_m E_{m,k}^{(n)},$$

where $L_{m,k}^{(n)} = \sum_{k' \in B_m^{(n)} \backslash k} \pi_{m,k}^{(n)}, h_{m,k}^{(n)}, \vec{h}_{m,k'}^{(n)} + \sum_{j \in M \backslash n} \sum_{u \in B_j^{(n)}} \pi_{m,k}^{(n)} h_{m,u}^{(n)} \vec{h}_{m,k}^{(n)}$ and $$\pi_{m,k}^{(n)} = (U_{m,k}^{(n)})' \frac{\left| \vec{h}_{m,k}^{(n)} w_{m,k'}^{(n)} \right|^2}{(1 + I_{m,k}^{(n)})^2}.$$

The transmitter calculates the interference matrix of the cell that the transmitter belongs to the other transmitter according to a third formula,
where the third formula is $$I_{m,u}^{(n)out,j} = \sum_{k \in B_m^{(n)}} \left| \vec{h}_{m,u}^{(n)} w_{m,k}^{(n)} \right|^2, \text{ where } u \in B_j^{(n)}.$$

In the foregoing formulas, m represents the transmitter 40n, M represents a set of transmitters performing coordinated beamforming, M\m represents a set of transmitters except the transmitter 40n, $B_m^{(n)}$ represents a set of users scheduled by the transmitter 40n in a subchannel n, $B_m^{(n)}$\k represents a set of users $B_m^{(n)}$ except a user k, $w_{m,k}^{(n)}$ represents a beamforming vector corresponding to data to be transmitted to the user k by the transmitter 40n in the subchannel n, $\vec{w}_{m,k}^{(n)}$ represents a conjugate of $w_{m,k}^{(n)}$, $h_{m,k}^{(n)}$ represents a channel coefficient matrix between the transmitter 40n and the user k in the subchannel n, $\vec{h}_{m,k}^{(n)}$ represents a conjugate of $h_{m,k}^{(n)}$, $\lambda_m$ represents a Lagrange duality variable of the transmitter 40n, $U_{m,k}^{(n)}$ represents a utility function corresponding to data transmitted to the user k by the transmitter 40n in the subchannel n.

The transmitter 40n is further configured to transmit the interference matrix of the cell that the transmitter belongs to other transmitter to the other transmitter, so that the next transmitter performing coordinated calculation with the transmitter 40n updates the beamforming vector of the next transmitter and an interference matrix of the next transmitter to other cell.

The transmitter 40n is further configured to acquire the interference matrix of the other transmitter to the cell that the transmitter belongs to updated by the other transmitter.

The transmitter 40n is further configured to, when the transmitter 40n is polled to perform calculation, update the beamforming vector corresponding to the data to be transmitted to each user in each subchannel of the cell that the transmitter belongs to according to a last acquired interference matrix of the other transmitter to the cell that the transmitter belongs to.

The transmitter 40n is further configured to determine whether a preset operational-stop condition is satisfied currently.

In a case that the preset operational-stop condition is satisfied currently, the transmitter 40n transmits the data of each user according to a last updated beamforming vector corresponding to the data to be transmitted to each user in each subchannel of the cell that the transmitter belongs to.

In a case that the preset operational-stop condition is not satisfied currently, the transmitter 40n calculates the interference matrix of the cell that the transmitter belongs to the other transmitter according to the updated beamforming vector corresponding to the data to be transmitted to each user in each subchannel of the cell that the transmitter belongs to, and repeatedly executes the processes of transmitting the interference matrix of the cell that the transmitter belongs to the other transmitter to the other transmitter, acquiring the interference matrix of the other transmitter to the cell that the transmitter belongs to updated by the other transmitter, updating the beamforming vector corresponding to the data to be transmitted to each user in each subchannel of the cell that the transmitter belongs to, and determining whether the preset operational-stop condition is satisfied currently.

It should be noted that in the embodiment of the disclosure, the user refers to a UE, the transmitter may be a base station, a relay station, or a combination of a base station and a relay station, which is not limited herein.

It should be noted that the transmitter of the embodiment of the disclosure may be the transmitter of the above device embodiment and may be configured to implement all technical solutions of the above device embodiment. The implementation process of the transmitter may refer to relevant description of the above embodiment, which is not described herein.

It can be seen from the above that, in the distributed beamforming system according to the embodiment of the disclosure, a plurality of transmitters perform coordinated beamforming, and an iterative operation is performed on a beamforming vector corresponding to data to be transmitted to each user in each subchannel of the cell that the transmitter belongs to by using an interference matrix among transmitters, so that interference dimension for each user in each subchannel of the transmitter is compressed in a subspace as small as possible, therefore, dimensions are acquired as many as possible to transfer useful data, channel capacity of the cell that the transmitter belongs to is improved, and throughput of the overall system is also improved.

Figure 5:
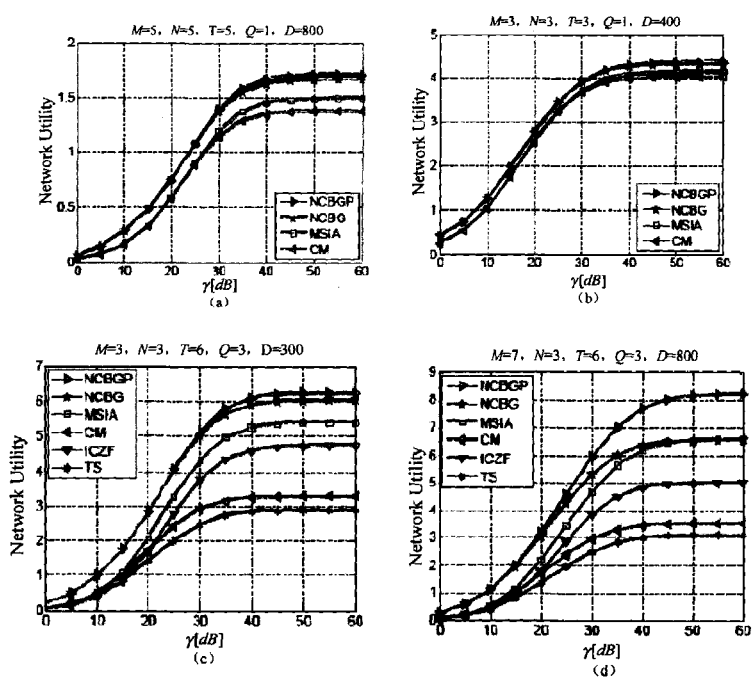
FIG. 5 illustrates schematic diagrams of testing results of network performance simulation for the distributed beamforming system provided according to the embodiment of the disclosure and other conventional systems in various simulation configurations.

FIG. 5 illustrates testing results of network performance simulation for systems such as the multi-cell multi-user distributed beamforming system of the disclosure (i.e., NCBGP in FIG. 5), a conventional max signal to interference plus noise ratio interference alignment system (MSIA), a conventional in-cell zero-forcing system (ICZF) and a conventional channel-matched beamforming system (CM) in the same configuration. In the simulation, a multi-cell multi-user system is considered, M is the number of transmitters (base stations), N is the number of subchannels, T is the total number of antennas of each cell (i.e., the transmitter), Q is the number of users scheduled by each transmitter, and D is a cell radius. As shown in FIG. 5, in various simulation configurations, the distributed beamforming system according to the disclosure has a great performance improvement relative to other conventional systems.

It should be noted that the above method embodiments are described as combinations of a series of actions to simplify description. Those skilled in the art should understand that the disclosure is not limited to the sequence of the described actions, since some steps may be performed in other sequences or performed at the same time according to the disclosure. In addition, those skilled in the art should also understand that the embodiments described in the specification are preferred embodiments, in which the involved actions and modules are not all necessary.

In the above embodiments, each embodiment emphasizes on different content and the part of one embodiment that is not described in detail may refer to relevant description in other embodiments.

Those skilled in the art should understand that all or a few of steps in the methods according to the embodiments may be implemented through relevant hardware instructed by a program. The program may be stored in a computer readable storage medium such as a read-only memory, a random access memory, a disk or a compact disk.

The distribute multi-cell multi-user beamforming method, the transmitter and the relevant system provided according to the disclosure are described in detail in the foregoing. In the disclosure, specific examples are used to specify the principle and embodiments of the disclosure, and the description of the foregoing embodiments is only intended to facilitate understanding the method and core principle of the disclosure. In addition, various modifications to the embodiments and applications may be made by those skilled in the art based on the spirit of the embodiments of the disclosure. Therefore, the invention is not limited to the specification.

What is claimed is:

1. A multi-cell multi-user distributed beamforming method comprising:

transmitting, by a first transmitter belonging to a first cell, channel coefficient matrix information of the first cell, to another transmitter performing coordinated beamforming with the first transmitter, wherein the channel coefficient matrix information of the first cell comprises a channel coefficient matrix for each user in each subchannel of the first cell;

acquiring, by the first transmitter, channel coefficient matrix information of the another transmitter, wherein the channel coefficient matrix information of the another transmitter comprises a channel coefficient matrix for each user in each subchannel of the another transmitter;

obtaining, by the first transmitter, a beamforming vector corresponding to data to be transmitted to each user in each subchannel of the first cell and an interference matrix of the first cell with respect to the another transmitter according to the channel coefficient matrix for each user in each subchannel of the first cell and the channel coefficient matrix information of the another transmitter;

transmitting the interference matrix of the first cell to the another transmitter, to enable the another transmitter performing the coordinated beamforming with the first transmitter to update the beamforming vector of the another transmitter and an interference matrix of the another transmitter to another cell;

acquiring an interference matrix of the another transmitter with respect to the first cell updated by the another transmitter;

when the first transmitter is polled, updating, by the first transmitter, the beamforming vector corresponding to the data to be transmitted to each user in each subchannel of the first cell according to a last acquired interference matrix of the another transmitter to the first cell; and determining, by the first transmitter, whether a preset operational-stop condition is satisfied currently;

when it is determined that the preset operational-stop condition is satisfied currently, transmitting, by the first transmitter, the data of each user according to a last updated beamforming vector corresponding to the data to be transmitted to each user in each subchannel of the first cell; and when it is determined that the preset operational-stop condition is not satisfied currently, obtaining, the interference matrix of the first cell with respect to the another transmitter according to the updated beamforming vector corresponding to the data to be transmitted to each user in each subchannel of the first cell and repeatedly performing the above processes of transmitting the interference matrix of the first cell with respect to the another transmitter, acquiring the interference matrix of the another transmitter with respect to the first cell as updated by the another transmitter, updating the beamforming vector corresponding to the data to be transmitted to each user in each subchannel of the first cell, and determining whether the preset operational-stop condition is satisfied currently.

2. The method according to claim 1, wherein obtaining the beamforming vector and the interference matrix of the another transmitter comprises:

obtaining the beamforming vector corresponding to the data to be transmitted to each user in each subchannel of the cell that the transmitter belongs to according to a first formula and a second formula, wherein the first formula is $w_{m,k}^{(n)} = \vec{T}_{m,k}^{(n)} h_{m,k}^{(n)} \sqrt{(1+I_{m,k}^{(n)})\phi_{m,k}^{(n)} r_{m,k}^{(n)}}$, and the second formula is $$I_{m,k}^{(n)} = \sum_{k' \in B_m^{(n)} \setminus k} \left| \vec{h}_{m,u}^{(n)} w_{m,k}^{(n)} \right|^2 + \sum_{j \in M \setminus n} \sum_{u \in B_j^{(n)}} \left| \vec{h}_{j,k}^{(n)} w_{j,u}^{(n)} \right|^2,$$

wherein in the first formula, $$\phi_{m,k}^{(n)} = \left[ \left[ U_{m,k}^{(n)} = \left( \frac{1 + I_{m,k}^{(n)}}{\vec{h}_{m,k}^{(n)} T_{m,k}^{(n)} \vec{h}_{m,k}^{(n)}} \right) \right]' \right]^{-1},$$

$$r_{m,k}^{(n)} = \frac{1}{\left( \vec{h}_{m,k}^{(n)} T_{m,k}^{(n)} \vec{h}_{m,k}^{(n)} \right)^2}, \text{ and}$$

$$\vec{T}_{m,k}^{(n)} = L_{m,k}^{(n)} + \lambda_m E_{m,k}^{(n)},$$

wherein $L_{m,k}^{(n)} = \sum_{k' \in B_m^{(n)} \setminus k} \pi_{m,k}^{(n)} h_{m,k}^{(n)} \vec{h}_{m,k'}^{(n)} + \sum_{j \in M \setminus n} \sum_{u \in B_j^{(n)}} \pi_{j,u}^{(n)} h_{m,u}^{(n)} \vec{h}_{m,u}^{(n)}$ -continued $$\pi_{m,k}^{(n)} = (U_{m,k}^{(n)})' \frac{\left|\vec{h}_{m,k}^{(n)} w_{m,k}^{(n)}\right|^2}{(1+I_{m,k}^{(n)})^2}, \text{ and}$$

$$T_{m,k}^{(n)} w_{m,k}^{(n)} = \left[U_{m,k}^{(n)}\left(\frac{\left|\vec{h}_{m,k}^{(n)} w_{m,k}^{(n)}\right|^2}{1+I_{m,k}^{(n)}}\right)\right]' \frac{h_{m,k}^{(n)} \vec{h}_{m,k}^{(n)} w_{m,k}^{(n)}}{1+I_{m,k}^{(n)}}; \text{ and}$$

obtaining the interference matrix of the first cell with respect to the another transmitter according to a third formula,
wherein the third formula is $$I_{m,u}^{(n)out,j} = \sum_{k \in B_m^{(n)}} \left|\vec{h}_{m,u}^{(n)} w_{m,k}^{(n)}\right|^2, \text{ wherein } u \in B_j^{(n)};$$

in the above formulas, m represents the first transmitter, M represents a set of transmitters performing coordinated beamforming, M\m represents the set of transmitters except the transmitter, $B_m^{(n)}$ represents a set of users scheduled by the first transmitter in a subchannel n, $B_m^{(n)}\backslash k$ represents the set of users $B_m^{(n)}$ except a user k, $w_{m,k}^{(n)}$ represents a beamforming vector corresponding to data to be transmitted to the user k by the first transmitter in the subchannel n, $\vec{w}_{m,k}^{(n)}$ represents a conjugate of $w_{m,k}^{(n)}$, $h_{m,k}^{(n)}$ represents a channel coefficient matrix between the first transmitter and the user k in the subchannel n, $\vec{h}_{m,k}^{(n)}$ represents a conjugate of $h_{m,k}^{(n)}$, $\lambda_m$ represents a Lagrange duality variable of the transmitter, $U_{m,k}^{(n)}$ represents a utility function corresponding to data transmitted to the user k by the first transmitter in the subchannel n; and
wherein the beamforming vector is updated using the first formula and the second formula.

3. The method according to claim 2, wherein $U_{m,k}^{(n)}$ is in any one of following three forms:

$$U_{m,k}^{(n)}(O_{m,k}^{(n)}) = w_{m,k}^{(n)} \log(O_{m,k}^{(n)}),$$

$$U_{m,k}^{(n)}(O_{m,k}^{(n)}) = \log(1 + O_{m,k}^{(n)}), \text{ and}$$

$$U_{m,k}^{(n)}(O_{m,k}^{(n)}) = \begin{cases} \log(O_{m,k}^{(n)}) & a=1 \\ (1-a)^{-1}(O_{m,k}^{(n)})^{1-a} & a \neq 1 \end{cases},$$

wherein in the three formulas, $$O_{m,k}^{(n)} = \frac{\left|\vec{h}_{m,k}^{(n)} w_{j,u}^{(n)}\right|^2}{1+I_{m,k}^{(n)}}.$$

4. The method according to claim 3, wherein obtaining the beamforming vector comprises:
setting $\lambda_m = (\lambda_m^{min} + \lambda_m^{max})/2$, wherein in obtaining the beamforming vector for the first time, $\lambda_m^{max}$ is a preset maximum Lagrange duality variable, and $\lambda_m^{min}$ is a preset minimum Lagrange duality variable;
determining whether the preset operational-stop condition is satisfied currently comprises:
determining whether a difference between $\lambda_m^{max}$ and $\lambda_m^{min}$ is smaller than a preset threshold currently;
when the difference between $\lambda_m^{max}$ and $\lambda_m^{min}$ is smaller than the preset threshold currently, determining that the preset operational-stop condition is satisfied currently; and
when the difference between $\lambda_m^{max}$ and $\lambda_m^{min}$ is not smaller than the preset threshold currently, determining whether $$\sum_{n \in N} \sum_{k \in B_m^{(n)}} p_{m,k}^{(n)} > P_m$$

is satisfied currently, determining that the preset stop condition is not satisfied currently and setting $\lambda_m^{min}$ to be equal to $\lambda_m$ when $$\sum_{n \in N} \sum_{k \in B_m^{(n)}} p_{m,k}^{(n)} > P_m,$$

and determining that the preset stop condition is not satisfied currently and setting $\lambda_m^{max}$ to be equal to $\lambda_m$ when $$\sum_{n \in N} \sum_{k \in B_m^{(n)}} p_{m,k}^{(n)} \leq P_m,$$

wherein $P_m$ represents a maximum transmission power of the first transmitter, and $p_{m,k}^{(n)} = (1+I_{m,k}^n)\phi_{m,k}^{(n)}\phi_{m,k}^{(n)}$, $\phi_{m,k}^{(n)} = \|\vec{T}_{m,k}^{(n)} h_{m,k}^{(n)}\|^2 r_{m,k}^{(n)}$.

5. The method according to claim 3, wherein determining whether the preset operational-stop condition is satisfied currently comprises:
determining whether the current accumulative number of times for determination succeeds a preset threshold, determining that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

6. The method according to claim 2, wherein obtaining the beamforming vector comprises:
setting $\lambda_m = (\lambda_m^{min} + \lambda_m^{max})/2$, wherein in obtaining the beamforming vector for the first time, $\lambda_m^{max}$ is a preset maximum Lagrange duality variable, and $\lambda_m^{min}$ is a preset minimum Lagrange duality variable; and
wherein determining whether the preset operational-stop condition is satisfied currently comprises:
determining whether a difference between $\lambda_m^{max}$ and $\lambda_m^{min}$ is smaller than a preset threshold currently;
when the difference between $\lambda_m^{max}$ and $\lambda_m^{min}$ is smaller than the preset threshold currently, determining that the preset operational-stop condition is satisfied currently; and
when the difference between $\lambda_m^{max}$ and $\lambda_m^{min}$ is not smaller than the preset threshold currently, determining whether $$\sum_{n \in N} \sum_{k \in B_m^{(n)}} p_{m,k}^{(n)} > P_m$$

is satisfied currently, determining that the preset stop condition is not satisfied currently and setting $\lambda_m^{min}$ to be equal to $\lambda_m$ when $$\sum_{n \in N} \sum_{k \in B_m^{(n)}} p_{m,k}^{(n)} > P_m,$$

and determining that the preset stop condition is not satisfied currently and setting $\lambda_m^{max}$ to be equal to $\lambda_m$ when $$\sum_{n \in N} \sum_{k \in B_m^{(n)}} p_{m,k}^{(n)} \leq P_m,$$

where $P_m$ represents a maximum transmission power of the first transmitter, and $p_{m,k}^{(n)} = (1 + I_{m,k}^{(n)}) \phi_{m,k}^{(n)} \phi_{m,k}^{(n)}$, $\phi_{m,k}^{(n)} = \| \vec{T}_{m,k}^{(n)} h_{m,k}^{(n)} \|^2 r_{m,k}^{(n)}$.

7. The method according to claim 2, wherein determining whether the preset operational-stop condition is satisfied currently comprises:
   determining whether the current accumulative number of times for determination succeeds a preset threshold, determining that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

8. The method according to claim 1, wherein determining whether the preset operational-stop condition is satisfied currently comprises:
   determining whether the current accumulative number of times for determination succeeds a preset threshold, determining that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

9. A first transmitter comprising:
   a transmitting unit configured to transmit channel coefficient matrix information of a first cell, to which the first transmitter belongs, to another transmitter performing coordinated beamforming with the first transmitter, wherein the channel coefficient matrix information of the first cell that the transmitter belongs to comprises a channel coefficient matrix for each user in each subchannel of the first cell;
   an acquiring unit configured to acquire channel coefficient matrix information of the another transmitter, wherein the channel coefficient matrix information of the another transmitter comprises a channel coefficient matrix for each user in each subchannel of the another transmitter;
   a calculation unit configured to obtain a beamforming vector corresponding to data to be transmitted to each user in each subchannel of the first cell and an interference matrix of the first cell with respect to the another transmitter according to the channel coefficient matrix for each user in each subchannel of the first cell and the channel coefficient matrix information of the another transmitter;
     wherein the transmitting unit is further configured to transmit the interference matrix of the first cell to the another transmitter, to enable the another transmitter performing the coordinated beamforming with the first transmitter to update the beamforming vector of the another transmitter and an interference matrix of the another transmitter to another cell, and
   the acquiring unit is further configured to acquire an interference matrix of the another transmitter to the first cell updated by the another transmitter;
   an updating unit configured to, when the first transmitter is polled, update the beamforming vector corresponding to the data to be transmitted to each user in each subchannel of the first cell according to a last acquired interference matrix of the another transmitter to the first cell;
   a determining unit configured to determine whether a preset operational-stop condition is satisfied currently;
   a transmission processing unit configured to transmit the data of each user according to the beamforming vector corresponding to the data to be transmitted to each user in each subchannel of the first cell which is last updated by the updating unit, when the determining unit determines that the preset operational-stop condition is satisfied currently;
   wherein the calculation unit is further configured to, when the determining unit determines that the preset operational-stop condition is not satisfied currently,
     obtain the interference matrix of the first cell with respect to the another transmitter according to the beamforming vector corresponding to the data to be transmitted to each user in each subchannel of the first cell which is updated by the updating unit, and
     trigger the transmitting unit to transmit to the another transmitter the interference matrix of the first cell with respect to the another transmitter obtained by the calculation unit.

10. The first transmitter according to claim 9, wherein the calculation unit is configured to obtain the beamforming vector corresponding to the data to be transmitted to each user in each subchannel of the cell that the first transmitter belongs to according to a first formula and a second formula,
   wherein the first formula is $w_{m,k}^{(n)} = \vec{T}_{m,k}^{(n)} h_{m,k}^{(n)} \sqrt{(1 + I_{m,k}^{(n)}) \phi_{m,k}^{(n)} r_{m,k}^{(n)}}$, and the second formula is $$I_{m,k}^{(n)} = \sum_{k' \in N_m^{(n)} \setminus k} \left| \vec{h}_{m,k}^{(n)} w_{m,k'}^{(n)} \right|^2 + \sum_{j \in M \setminus n} \sum_{u \in B_j^{(n)}} \left| \vec{h}_{j,k}^{(n)} w_{j,u}^{(n)} \right|^2,$$

wherein in the first formula, $$\phi_{m,k}^{(n)} = \left[ \left[ U_{m,k}^{(n)} \left( \frac{1 + I_{m,k}^{(n)}}{\vec{h}_{m,k}^{(n)} \vec{T}_{m,k}^{(n)} h_{m,k}^{(n)}} \right) \right]' \right]^{-1},$$

-continued $$r_{m,k}^{(n)} = \frac{1}{\left(\vec{h}_{m,k}^{(n)} \vec{T}_{m,k}^{(n)} h_{m,k}^{(n)}\right)^2},$$

and $$\vec{T}_{m,k}^{(n)} = L_{m,k}^{(n)} + \lambda_m E_{m,k}^{(n)},$$

wherein $$L_{m,k}^{(n)} = \sum_{k' \in B_m^{(n)} \setminus k} \pi_{m,k'}^{(n)} h_{m,k'}^{(n)} \vec{h}_{m,k'}^{(n)} + \sum_{j \in M \setminus n} \sum_{u \in B_j^{(n)}} \pi_{j,u}^{(n)} h_{m,u}^{(n)} \vec{h}_{m,u}^{(n)},$$

$$\pi_{m,k}^{(n)} = (U_{m,k}^{(n)})' \frac{\left|\vec{h}_{m,k}^{(n)} w_{m,k}^{(n)}\right|^2}{(1 + I_{m,k}^{(n)})^2},$$

and $$T_{m,k}^{(n)} w_{m,k}^{(n)} = \left[U_{m,k}^{(n)} \left(\frac{\left|\vec{h}_{m,k}^{(n)} w_{m,k}^{(n)}\right|}{1 + I_{m,k}^{(n)}}\right)\right]' \frac{h_{m,k}^{(n)} \vec{h}_{m,k}^{(n)} w_{m,k}^{(n)}}{1 + I_{m,k}^{(n)}}; \text{ and}$$

obtain the interference matrix of the first cell with respect to the another transmitter according to a third formula, wherein the third formula is $$I_{m,u}^{(n)out,j} = \sum_{k \in B_m^{(n)}} \left|\vec{h}_{m,u}^{(n)} w_{m,k}^{(n)}\right|^2,$$

wherein $u \in B_j^{(n)}$;

in the above formulas, m represents the first transmitter, M represents a set of transmitters performing coordinated beamforming, M\m represents the set of transmitters except the first transmitter, $B_m^{(n)}$ represents a set of users scheduled by the first transmitter in a subchannel n, $B_m^{(n)} \setminus k$ represents the set of users $B_m^{(n)}$ except a user k, $w_{m,k}^{(n)}$ represents a beamforming vector corresponding to data to be transmitted to the user k by the first transmitter in the subchannel n, $\vec{w}_{m,k}^{(n)}$ represents a conjugate of $w_{m,k}^{(n)}$, $h_{m,k}^{(n)}$ represents a channel coefficient matrix between the first transmitter and the user k in the subchannel n, $\vec{h}_{m,k}^{(n)}$ represents a conjugate of $h_{m,k}^{(n)}$, $\lambda_m$ represents a Lagrange duality variable of the first transmitter, $U_{m,k}^{(n)}$ represents a utility function corresponding to data transmitted to the user k by the first transmitter in the subchannel n; and
the updating unit is configured to update the beamforming vector using the first formula and the second formula.

11. The first transmitter according to claim 10, wherein the calculation unit is configured to set $\lambda_m = (\lambda_m^{min} + \lambda_m^{max})/2$, wherein in obtaining the beamforming vector for the first time, $\lambda_m^{max}$ is a preset maximum Lagrange duality variable, and $\lambda_m^{min}$ is a preset minimum Lagrange duality variable; and
the determining unit is configured to determine whether a difference between $\lambda_m^{max}$ and $\lambda_m^{min}$ is smaller than a preset threshold currently, determine that the preset operational-stop condition is satisfied currently when the difference between $\lambda_m^{max}$ and $\lambda_m^{max}$ is smaller than the preset threshold currently, and determine that the operational-stop condition is not satisfied currently when the difference between $\lambda_m^{max}$ and $\lambda_m^{min}$ is not smaller than the preset threshold currently;
the determining unit further comprises:
a determining subunit, configured to determine whether $$\sum_{n \in N} \sum_{k \in B_m^{(n)}} p_{m,k}^{(n)} > P_m$$

is satisfied currently in a case that it is determined that the difference between $\lambda_m^{max}$ and $\lambda_m^{min}$ is not smaller than the preset threshold currently; and
an assigning unit, configured to set $\lambda_m^{min}$ to be equal to $\lambda_m$ when the determining subunit determines that $$\sum_{n \in N} \sum_{k \in B_m^{(n)}} p_{m,k}^{(n)} > P_m$$

is satisfied currently, and set $\lambda_m^{max}$ be equal to $\lambda_m$ when the determining subunit determines that $$\sum_{n \in N} \sum_{k \in B_m^{(n)}} p_{m,k}^{(n)} \leq P_m$$

is satisfied currently,
wherein $P_m$ represents a maximum transmission power of the first transmitter, wherein $p_{m,k}^{(n)} = (1 + I_{m,k}^{(n)}) \phi_{m,k}^{(n)} \phi_{m,k}^{(n)}$, $\phi_{m,k}^{(n)} = \|\vec{T}_{m,k}^{(n)} h_{m,k}^{(n)}\|^2 r_{m,k}^{(n)}$.

12. The first transmitter according to claim 10, wherein the determining unit is configured to:
determine whether the current accumulative number of times for determination succeeds a preset threshold, determine that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

13. The first transmitter according to claim 9, wherein
the determining unit is configured to: determine whether the current accumulative number of times for determination succeeds a preset threshold, determine that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

14. A first transmitter comprising an input device, an output device, a memory and a processor, wherein the processor executes the following:
transmitting channel coefficient matrix information of a first cell, to which the first transmitter belongs, to another transmitter performing coordinated beamforming with the first transmitter, wherein the channel coefficient matrix information of the first cell comprises a channel coefficient matrix for each user in each subchannel of the first cell;

acquiring channel coefficient matrix information of the another transmitter, wherein the channel coefficient matrix information of the another transmitter comprises a channel coefficient matrix for each user in each subchannel of the another transmitter;

obtaining a beamforming vector corresponding to data to be transmitted to each user in each subchannel of the first cell and an interference matrix of the first cell with respect to the another transmitter according to the channel coefficient matrix for each user in each subchannel of the first cell and the channel coefficient matrix information of the another transmitter;

transmitting to the another transmitter the interference matrix of the first cell with respect to the other transmitter, so that the another transmitter performing the coordinated beamforming with the first transmitter updates the beamforming vector of the another transmitter and an interference matrix of the another transmitter to another cell;

acquiring an interference matrix of the another transmitter with respect to the first cell updated by the another transmitter;

when the first transmitter is polled, updating the beamforming vector corresponding to the data to be transmitted to each user in each subchannel of the first cell according to a last acquired interference matrix of the another transmitter with respect to the first cell; and determining whether a preset operational-stop condition is satisfied currently;

when it is determined that the preset operational-stop condition is satisfied currently, transmitting the data of each user according to a last updated beamforming vector corresponding to the data to be transmitted to each user in each subchannel of the first cell; and when it is determined that the preset operational-stop condition is not satisfied currently, obtaining the interference matrix of the first cell with respect to the another transmitter according to the updated beamforming vector corresponding to the data to be transmitted to each user in each subchannel of the first cell, and repeatedly performing the above processes of:

transmitting the interference matrix of the first cell with respect to the another transmitter, acquiring the interference matrix of the another transmitter with respect to the first cell as updated by the another transmitter, updating the beamforming vector corresponding to the data to be transmitted to each user in each subchannel of the first cell, and determining whether the preset operational-stop condition is satisfied currently.

15. The first transmitter according to claim 14, wherein obtaining the beamforming vector and the interference matrix of the another transmitter comprises:

obtaining the beamforming vector corresponding to the data to be transmitted to each user in each subchannel of the first cell according to a first formula and a second formula, wherein the first formula is $w_{m,k}^{(n)} = \vec{T}_{m,k}^{(n)} h_{m,k}^{(n)} \sqrt{(1+I_{m,k}^{(n)})\phi_{m,k}^{(n)} r_{m,k}^{(n)}}$, and the second formula is $$I_{m,k}^{(n)} = \sum_{k' \in B_m^{(n)} \setminus k} \left|\vec{h}_{m,k}^{(n)} w_{m,k'}^{(n)}\right|^2 + \sum_{j \in M \setminus n} \sum_{u \in B_j^{(n)}} \left|\vec{h}_{j,k}^{(n)} w_{j,u}^{(n)}\right|^2,$$

wherein in the first formula, $$\phi_{m,k}^{(n)} = \left[\left[U_{m,k}^{(n)}\left(\frac{1+I_{m,k}^{(n)}}{\vec{h}_{m,k}^{(n)} \vec{T}_{m,k}^{(n)} h_{m,k}^{(n)}}\right)\right]'\right]^{-1},$$

$$r_{m,k}^{(n)} = \frac{1}{\left(\vec{h}_{m,k}^{(n)} \vec{T}_{m,k}^{(n)} h_{m,k}^{(n)}\right)^2},$$

and $$\vec{T}_{m,k}^{(n)} = L_{m,k}^{(n)} + \lambda_m E_{m,k}^{(n)},$$

wherein $$L_{m,k}^{(n)} = \sum_{k' \in B_m^{(n)} \setminus k} \pi_{m,k'}^{(n)} h_{m,k'}^{(n)} \vec{h}_{m,k'}^{(n)} + \sum_{j \in M \setminus n} \sum_{u \in B_j^{(n)}} \pi_{j,u}^{(n)} h_{m,u}^{(n)} \vec{h}_{m,u}^{(n)},$$

$$\pi_{m,k}^{(n)} = (U_{m,k}^{(n)})' \frac{\left|\vec{h}_{m,k}^{(n)} w_{m,k}^{(n)}\right|^2}{(1+I_{m,k}^{(n)})^2},$$

and $$T_{m,k}^{(n)} w_{m,k}^{(n)} = \left[U_{m,k}^{(n)}\left(\frac{\left|\vec{h}_{m,k}^{(n)} w_{m,k}^{(n)}\right|}{1+I_{m,k}^{(n)}}\right)\right]' \frac{h_{m,k}^{(n)} \vec{h}_{m,k}^{(n)} w_{m,k}^{(n)}}{1+I_{m,k}^{(n)}}; \text{ and}$$

obtaining the interference matrix of the first cell with respect to the another transmitter according to a third formula, wherein the third formula is $$I_{m,u}^{(n)out,j} = \sum_{k \in B_m^{(n)}} \left|\vec{h}_{m,u}^{(n)} w_{m,k}^{(n)}\right|^2,$$

wherein $u \in B_j^{(n)}$;

in the above formulas, m represents the first transmitter, M represents a set of transmitters performing coordinated beamforming, M\m represents the set of transmitters except the transmitter, $B_m^{(n)}$ represents a set of users scheduled by the transmitter in a subchannel n, $B_m^{(n)} \setminus k$ represents the set of users $B_m^{(n)}$ except a user k, $w_{m,k}^{(n)}$ represents a beamforming vector corresponding to data to be transmitted to the user k by the first transmitter in the subchannel n, $\vec{w}_{m,k}^{(n)}$ represents a conjugate of $w_{m,k}^{(n)}$, $h_{m,k}^{(n)}$ represents a channel coefficient matrix between the first transmitter and the user k in the subchannel n, $\vec{h}_{m,k}^{(n)}$ represents a conjugate of $h_{m,k}^{(n)}$, $\lambda_m$ represents a Lagrange duality variable of the first transmitter, $U_{m,k}^{(n)}$ represents a utility function corresponding to data transmitted to the user k by the first transmitter in the subchannel n; and wherein the beamforming vector is updated by the updating unit using the first formula and the second formula.

16. The first transmitter according to claim 15, wherein obtaining the beamforming vector comprises:

setting $\lambda_m = (\lambda_m^{min} + \lambda_m^{max})/2$, wherein in obtaining the beamforming vector for the first time, $\lambda_m^{max}$ is a preset maximum Lagrange duality variable, and $\lambda_m^{min}$ is a preset minimum Lagrange duality variable;

determining whether the preset operational-stop condition is satisfied currently comprises:

determining whether a difference between $\lambda_m^{max}$ and $\lambda_m^{min}$ is smaller than a preset threshold currently;

when the difference between $\lambda_m^{max}$ and $\lambda_m^{min}$ is smaller than the preset threshold currently, determining that the preset operational-stop condition is satisfied currently; and when the difference between $\lambda_m^{max}$ and $\lambda_m^{min}$ is not smaller than the preset threshold currently, determining whether $$\sum_{n \in N} \sum_{k \in B_m^{(n)}} p_{m,k}^{(n)} > P_m$$

is satisfied currently, determining that the preset stop condition is not satisfied currently and setting $\lambda_m^{min}$ to be equal to $\lambda_m$ when $$\sum_{n \in N} \sum_{k \in B_m^{(n)}} p_{m,k}^{(n)} > P_m,$$

and determining that the preset stop condition is not satisfied currently and setting $\lambda_m^{max}$ to be equal to $\lambda_m$ when $$\sum_{n \in N} \sum_{k \in B_m^{(n)}} p_{m,k}^{(n)} \le P_m,$$

wherein $P_m$ represents a maximum transmission power of the transmitter, and $p_{m,k}^{(n)} = (1+I_{m,k}^{n})\phi_{m,k}^{(n)}\phi_{m,k}^{(n)}$, $\phi_{m,k}^{(n)} = \|\vec{T}_{m,k}^{(n)} h_{m,k}^{(n)}\|^2 r_{m,k}^{(n)}$.

17. The first transmitter according to claim 16, wherein determining whether the preset operational-stop condition is satisfied currently comprises:

determining whether the current accumulative number of times for determination succeeds a preset threshold, determining that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

18. The first transmitter according to claim 15, wherein determining whether the preset operational-stop condition is satisfied currently comprises:

determining whether the current accumulative number of times for determination succeeds a preset threshold, determining that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

19. The first transmitter according to claim 14, wherein determining whether the preset operational-stop condition is satisfied currently comprises:

determining whether the current accumulative number of times for determination succeeds a preset threshold, determining that the preset operational-stop condition is satisfied currently when the current accumulative number of times for determination succeeds the preset threshold, and determining that the preset operational-stop condition is not satisfied currently when the current accumulative number of times for determination does not succeed the preset threshold.

* * * * *